US011096168B2

(12) United States Patent
Takeda et al.

(10) Patent No.: US 11,096,168 B2
(45) Date of Patent: *Aug. 17, 2021

(54) TERMINAL, RADIO COMMUNICATION METHOD, AND RADIO BASE STATION

(71) Applicant: NTT DOCOMO, INC., Tokyo (JP)

(72) Inventors: Kazuki Takeda, Tokyo (JP); Tooru Uchino, Tokyo (JP); Kazuaki Takeda, Tokyo (JP); Satoshi Nagata, Tokyo (JP); Hiroki Harada, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/871,336

(22) Filed: May 11, 2020

(65) Prior Publication Data

US 2020/0275442 A1 Aug. 27, 2020

Related U.S. Application Data

(63) Continuation of application No. 15/753,429, filed as application No. PCT/JP2016/074166 on Aug. 19, 2016, now Pat. No. 10,694,516.

(30) Foreign Application Priority Data

Aug. 21, 2015 (JP) .............................. JP2015-164190

(51) Int. Cl.
*H04W 72/04* (2009.01)
*H04L 5/00* (2006.01)
*H04L 27/26* (2006.01)

(52) U.S. Cl.
CPC ......... *H04W 72/0446* (2013.01); *H04L 5/001* (2013.01); *H04L 27/2602* (2013.01); *H04W 72/042* (2013.01)

(58) Field of Classification Search
None
See application file for complete search history.

(56) References Cited

U.S. PATENT DOCUMENTS 8,150,478 B2 * 4/2012 Perets .................. H04W 52/08
455/574
8,537,862 B2 * 9/2013 Blankenship ......... H04L 1/0004
370/483

(Continued)

FOREIGN PATENT DOCUMENTS

CN 104468030 A 3/2015
EP 2816858 A1 12/2014

(Continued)

OTHER PUBLICATIONS

International Search Report issued in PCT/JP2016/074166 dated Oct. 25, 2016 (1 page).

(Continued)

*Primary Examiner* — Bunjob Jaroenchonwanit
(74) *Attorney, Agent, or Firm* — Osha Bergman Watanabe & Burton LLP

(57) ABSTRACT

A terminal is disclosed that includes a receiving section that receives downlink control information (DCI) and a control section that assumes that scheduling of 1 ms Transmission Time Interval (TTI) length in a first CC is performed based on DCI that is received in 1 ms TTI length of a second CC that is different from the first CC and is not performed based on DCI that is received in TTI length shorter than 1 ms of a third CC that is different from the first CC. In other aspects, a radio communication method for a terminal and a radio base station are disclosed.

4 Claims, 17 Drawing Sheets

(56) References Cited

U.S. PATENT DOCUMENTS

| | | | | |
|---|---|---|---|---|
| 8,693,433 B2* | 4/2014 | Xue | H04W 72/04 | 370/330 |
| 8,885,525 B2* | 11/2014 | Hsieh | H04L 1/1845 | 370/280 |
| 9,191,172 B2* | 11/2015 | Kim | H04L 5/1469 | |
| 9,538,503 B2* | 1/2017 | Papasakellariou | H04L 5/001 | |
| 9,544,885 B2* | 1/2017 | You | H04L 1/1861 | |
| 9,596,701 B2* | 3/2017 | Park | H04W 74/004 | |
| 10,097,326 B2* | 10/2018 | Ahn | H04L 5/005 | |
| 10,694,516 B2* | 6/2020 | Takeda | H04L 5/001 | |
| 2012/0069831 A1* | 3/2012 | Miki | H04L 5/0037 | 370/338 |
| 2012/0076089 A1* | 3/2012 | Kawamura | H04L 1/0073 | 370/329 |
| 2013/0058315 A1* | 3/2013 | Feuersanger | H04W 52/346 | 370/336 |
| 2013/0170406 A1* | 7/2013 | Kishiyama | H04L 1/0026 | 370/280 |
| 2015/0009953 A1* | 1/2015 | Park | H04W 72/12 | 370/330 |
| 2015/0189675 A1* | 7/2015 | Feuersaenger | H04W 52/327 | 370/329 |
| 2016/0044644 A1* | 2/2016 | Lyu | H04W 72/042 | 370/329 |
| 2016/0255594 A1* | 9/2016 | Vajapeyam | H04W 52/346 | 455/522 |
| 2016/0255611 A1* | 9/2016 | Damnjanovic | H04L 5/0087 | 370/330 |
| 2016/0345311 A1* | 11/2016 | Chen | H04W 72/0446 | |
| 2017/0164363 A1* | 6/2017 | Zhang | H04L 47/286 | |
| 2017/0290008 A1* | 10/2017 | Tooher | H04L 1/0007 | |
| 2017/0302410 A1* | 10/2017 | Liu | H04W 72/0413 | |
| 2018/0035463 A1* | 2/2018 | Mallik | H04W 74/0816 | |
| 2018/0049226 A1* | 2/2018 | Chen | H04L 5/0055 | |
| 2018/0062707 A1* | 3/2018 | Chen | H04L 5/06 | |
| 2018/0092128 A1* | 3/2018 | Um | H04W 16/14 | |
| 2018/0123769 A1* | 5/2018 | Pelletier | H04L 5/001 | |
| 2018/0139772 A1* | 5/2018 | Ozturk | H04W 52/0225 | |
| 2018/0160440 A1* | 6/2018 | Hosseini | H04W 56/0045 | |
| 2018/0213530 A1* | 7/2018 | Mochizuki | H04W 72/0446 | |
| 2018/0234998 A1* | 8/2018 | You | H04W 72/1273 | |
| 2018/0279339 A1* | 9/2018 | Lohr | H04W 52/34 | |
| 2018/0294926 A1* | 10/2018 | Loehr | H04L 1/1854 | |
| 2019/0007943 A1* | 1/2019 | Takeda | H04W 72/0446 | |
| 2019/0150181 A1* | 5/2019 | Kim | H04L 1/1858 | 370/329 |
| 2019/0268778 A1* | 8/2019 | Vajapeyam | H04L 1/1854 | |
| 2020/0146004 A1* | 5/2020 | Li | H04W 72/04 | |
| 2020/0275442 A1* | 8/2020 | Takeda | H04W 72/0446 | |

FOREIGN PATENT DOCUMENTS

| | | |
|---|---|---|
| EP | 3179654 A1 | 6/2017 |
| EP | 3242514 A1 | 11/2017 |
| EP | 3262873 A2 | 1/2018 |
| WO | 2014204202 A1 | 12/2014 |

OTHER PUBLICATIONS

Written Opinion of the International Searching Authority issued in PCT/JP2016/074166 dated Oct. 25, 2016 (3 pages).

NTT Docomo, Inc.; "Discussion on discontinuous transmission and scheduling design for LAA DL"; 3GPP TSG RAN WG1 Meeting #82, R1-154406; Beijing, China; Aug. 24-28, 2015 (5 pages).

Sharp; "Subframe structure for LAA discontinuous transmission"; 3GPP TSG RAN WG1 #82 Meeting R1-154069; Beijing, China; Aug. 24-28, 2015 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in counterpart European Patent Application No. 16839186.0, dated Feb. 22, 2019 (10 pages).

Office Action issued in European Application No. 16839186.0; dated Jan. 28, 2020 (9 pages).

Office Action issued in the counterpart European Patent Application No. 16839186.0, dated Jul. 8, 2020 (7 pages).

Office Action issued in the counterpart Japanese Patent Application No. 2017-536393, dated Jun. 16, 2020 (4 pages).

Ericsson; "Study of shorter TTI for latency reduction"; 3GPP TSG-RAN WG2 #91, Tdoc R2-153493; Beijing, China, Aug. 24-28, 2015 (5 pages).

* cited by examiner

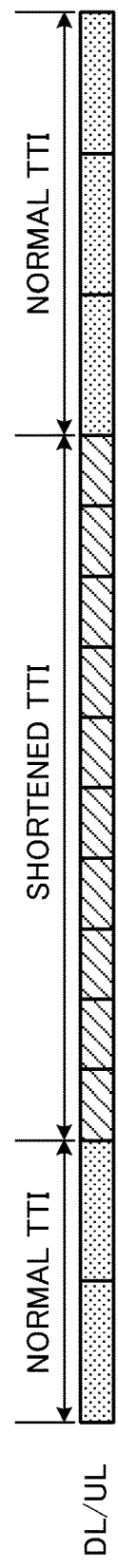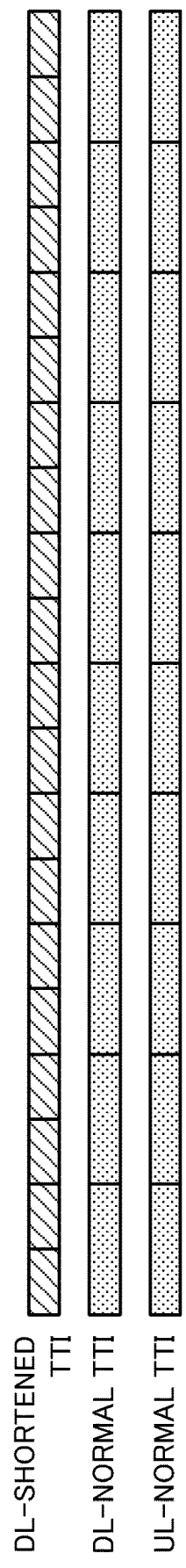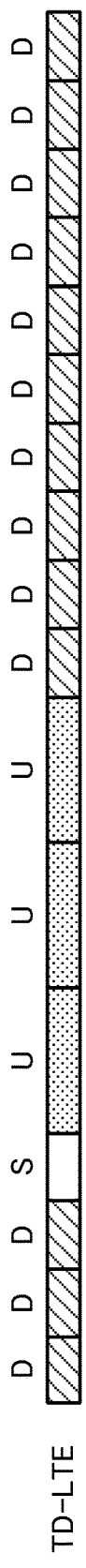

TERMINAL, RADIO COMMUNICATION METHOD, AND RADIO BASE STATION

CROSS-REFERENCE TO RELATED APPLICATIONS

This application is a continuation application and, thereby, claims benefit under 35 U.S.C. § 120 to U.S. patent application Ser. No. 15/753,429, filed on Feb. 19, 2018, which is a national phase application of PCT/JP2016/074166, filed on Aug. 19, 2016, which claims priority to Japanese Patent Application No. 2015-164190, filed on Aug. 21, 2015. The contents of these applications are hereby incorporated by reference in their entirety.

TECHNICAL FIELD

The present invention pertains to user equipment, a wireless base station, and a wireless communication method in a next generation mobile communication system.

BACKGROUND ART

A Long Term Evolution (LTE) (Non-patent document 1) was standardized for the purpose of attaining a much faster data rate and decreasing a delay in a UMTS (Universal Mobile Telecommunications System) network. LTE-Advanced (also termed LTE Rel. 10-12) was standardized aiming at attaining a much broader band and greater acceleration than LTE, and an examination of a succeeding system (called LTE Rel. 13, 5G (5th generation mobile communication system)) is underway.

According to LTE Rel. 8-12, a TTI (Transmission Time Interval) applied to DL (DownLink) transmission and UL (UpLink) transmission between a wireless base station and user equipment (UE) is 1 ms. The TTI in an LTE system (Rel. 8-12) is also called a subframe length.

CITATION LIST

Non-Patent Literature

[Non-Patent Document 1] 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future wireless communication systems instanced by the LTE and 5G from Rel.13 onward assume performing communications with a relatively small data size as exemplified by communications at a frequency band as high as several tens of GHz, IoT (Internet of Things), MTC (Machine Type Communication), and M2M (Machine To Machine). When applying a communication method (with the TTI (Transmission Time Interval) being, e.g., 1 ms) based on LTE Rel.8-12 to those future wireless communication systems, there exists an apprehension of being unable to provide sufficient communication services.

Such being the case, it is considered in the future wireless communication systems that the communications will be performed by making use of a shortened TTI into which a normal TTI of 1 ms used in the existing LTE is reduced. In this case, it is also considered that the communications (e.g., CA (Carrier Aggregation) or DC (Dual Connectivity)) are performed by connecting to a plurality of cells including 2 CCs (Common Carriers) having different TTIs (e.g., the CC using the normal TTI and the CC using the shortened TTI). A problem, however, arises about how the communications are controlled in a state of coexistence of the shortened TTI and the normal TTI.

It is one object of the present invention conceived in view of such points to provide user equipment, a wireless base station and a wireless communication method each enabling communications to be properly performed even in the coexistence of a shortened TTI and a normal TTI.

Solution to Problem

According to one aspect of the present invention, user equipment performing communications by using a plurality of CCs (Component Carriers) including at least two CCs having different TTI (Transmission Time Interval) lengths, includes: a receiving section receiving downlink control information in a first CC; and a control section controlling the communication in a second CC different from the first CC, based on the downlink control information.

Advantageous Effects of Invention

The present invention enables the communications to be properly performed even in the coexistence of the shortened TTI and the normal TTI.

BRIEF DESCRIPTION OF DRAWINGS

FIG. 3A is a diagram illustrating a first setting example of the shortened TTI; FIG. 3B is a diagram illustrating a second setting example of the shortened TTI; and FIG. 3C is a diagram illustrating a third setting example of the shortened TTI.

FIG. 6A is the explanatory diagram of an example wherein user equipment attempts to receive downlink data at a plurality of short TTIs corresponding to long TTIs; FIG. 6B is the explanatory diagram of an example wherein the user equipment attempts to receive the downlink data at a head TTI of the short TTIs corresponding to the long TTIs; and FIG. 6C is the explanatory diagram of an example wherein the user equipment tries to receive the downlink data at the TTI, designated by a wireless base station, of the short TTIs corresponding to the long TTIs.

FIG. 7A is the explanatory diagram illustrating an example wherein the user equipment attempts to receive the downlink control information by using an arbitrary TTI as a TTI of a CC4 employed for receiving the downlink control information; and FIG. 7B is the explanatory diagram illustrating an example wherein the user equipment attempts to receive the downlink control information by using a head TTI.

DESCRIPTION OF EMBODIMENTS

Figure 1:
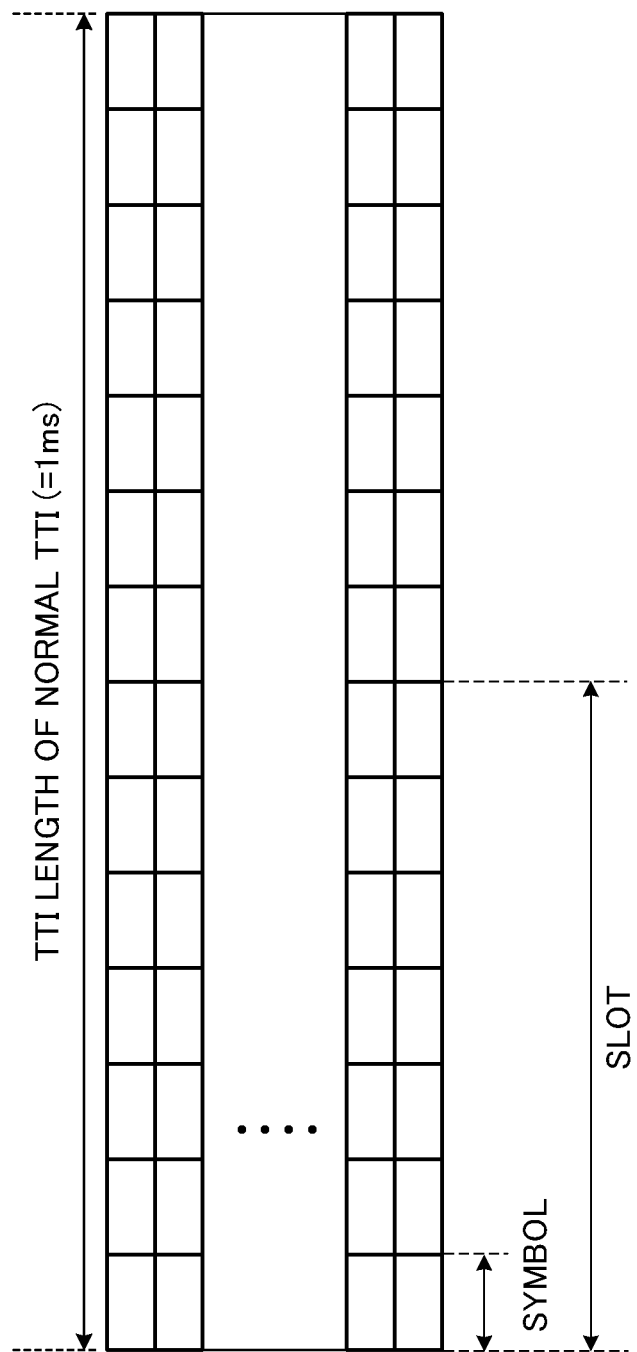
FIG. 1 is a diagram illustrating one example of a transmission time interval (TTI) in an existing LTE system (Rel.8-12).

FIG. 1 is a diagram illustrating one example of a transmission time interval (TTI) in an existing LTE system (Rel.8-12). A normal TTI (BTTI) is also called a subframe and is configured to include two time slots. The normal TTI is defined as a transmission time unit of a 1 channel-coded data/packet (transport block) and also a processing unitary parameter for Scheduling, Link Adaptation and other equivalent communication schemes.

As depicted in FIG. 1, in the case of a normal cyclic prefix (CP) in a downlink (DL), the normal TTI is configured to include 14 OFDM (Orthogonal Frequency Division Multiplexing) symbols (7 OFDM symbols per slot). Each OFDM symbol has a time length (symbol length) of 66.7 μs and is attached with the normal CP of 4.76 μs. The symbol length and a subcarrier interval are mutually in a multiplicative inverse relationship, and hence the subcarrier interval is 15 kHz when the symbol length is 66.7 μs.

In the case of the normal cyclic prefix (CP) in an uplink (UL), the normal TTI is configured to include 14 SC-FDMA (Single Carrier Frequency Division Multiple Access) symbols (7 SC-FDMA symbols per slot). Each SC-FDMA symbol has a time length (symbol length) of 66.7 μs, and is attached with the normal CP of 4.76 μs. The symbol length and the subcarrier interval are mutually in the multiplicative inverse relationship, and therefore the subcarrier interval is 15 kHz when the symbol length is 66.7 μs.

Note that the normal TTI may also be configured to include the 12 OFDM symbols (or 12 SC-FDMA symbols) in the case of an extended CP. In this case, each OFDM symbol (or each SC-FDMA symbol) has a time length of 66.7 μs, and is attached with the extended CP of 16.67 μs.

On the other hand, interfaces desired in a future wireless communication system, instanced by 5G and LTE Rel.13 onward, are wireless interfaces suited to a frequency band as high as several tens of GHz and wireless interfaces that are small in packet size but minimize delay, in order to be suited to communications having a relatively small data size as exemplified by IoT (Internet of Things), MTC (Machine Type Communication) and M2M (Machine To Machine).

It is therefore considered in the future communication system that the communications will be performed by making use of a shortened TTI (RTTI) with the normal TTI being made shorter (reduced) than 1 ms. When using the TTI shorter in time length than the normal TTI, there increases a timewise margin against processing (e.g., coding, decoding and other equivalent processing) in user equipment (UE) and a wireless base station, thereby enabling a processing delay to be decreased. When using the shortened TTI, it is feasible to increase the number of user equipments receivable per unit time (e.g., 1 ms).

(Example of Configuration of Shortened TTI)

Figure 2A:
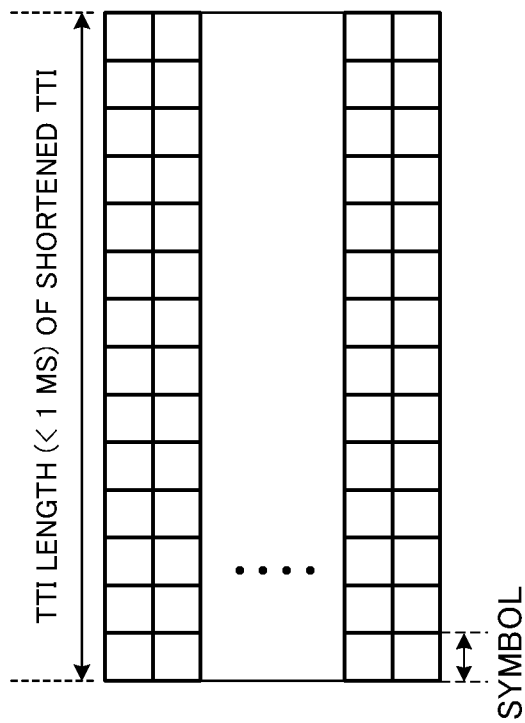
FIG. 2A is a diagram illustrating an example of a first configuration of a shortened TTI.
Figure 2B:
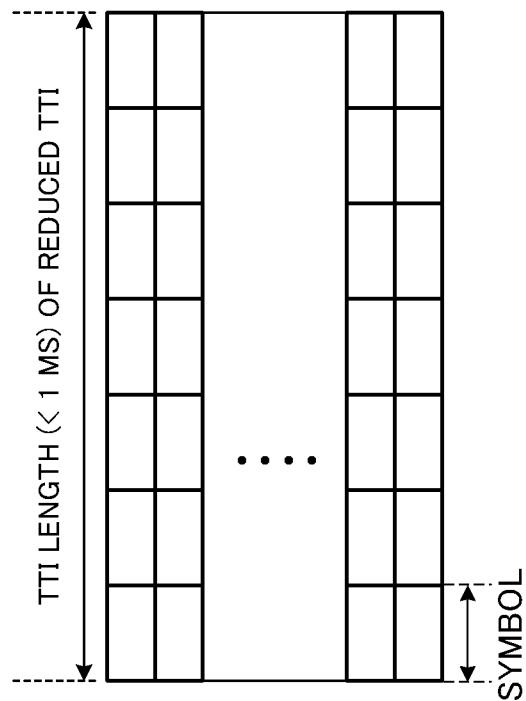
FIG. 2B is a diagram illustrating an example of a second configuration of the shortened TTI.

An example of a configuration of the shortened TTI will be described with reference to FIGS. 2A and 2B. FIGS. 2A and 2B are diagrams illustrating the example of the configuration of the shortened TTI. As depicted in FIGS. 2A and 2B, the shortened TTI has a time length (TTI length) shorter than 1 ms. The shortened TTI may have such a TTI length that a multiple of, e.g., 0.5 ms, 0.25 ms, 0.2 ms and 0.1 ms becomes 1 ms. The shortened TTI can be thereby introduced while keeping a compatibility with the normal TTI, i.e., 1 ms.

Note that an instance of the normal CP will be described by way of one example in FIGS. 2A and 2B, but the embodiment is not limited to this instance. It may be sufficient that the shortened TTI has the time length shorter than the normal TTI, and all types of configurations of a symbol count, a symbol length and a CP length within the shortened TTI may be taken. The following discussion will describe an example in which the OFDM symbol is used in the DL, while the SC-FDMA symbol is used in the UL, but the embodiment is not limited to this example.

FIG. 2A is the diagram illustrating a first configuration example of the shortened TTI. As illustrated in FIG. 2A, the first configuration example is that the shortened TTI is configured to include the same 14 OFDM symbols (or SC-FDMA symbols) as those of the normal TTI, and each OFDM symbol (each SC-FDMA symbol) has the symbol length shorter than the symbol length (=66.7 as) of the normal TTI.

As depicted in FIG. 2A, a signal configuration of a physical layer of the normal TTI can be diverted to when shortening the symbol length while keeping the symbol count of the normal TTI. The same information content (bit quantity) as that of the normal TTI can be also contained in the shortened TTI while keeping the symbol count of the normal TTI. The symbol length is shortened, and hence the subcarrier interval can be expanded. It is therefore feasible to decrease the degree of impact of phase noise, especially in a high frequency domain.

FIG. 2B is a diagram illustrating a second configuration example of the shortened TTI. As depicted in FIG. 2B, the second configuration example is that the shortened TTI is configured to include a smaller number of OFDM symbols (or SC-FDMA symbols) than those of the normal TTI, and each OFDM symbol (each SC-FDMA symbol) has the same symbol length (=66.7 is) as that of the normal TTI. For example, in FIG. 2B, the shortened TTI is configured to include 7 OFDM symbols (SC-FDMA symbols), which is half of the symbols of the normal TTI.

As illustrated in FIG. 2B, when reducing the symbol count while keeping the symbol length, the information content (bit quantity) contained in the shortened TTI can be reduced to a greater degree than the normal TTI. The user equipment is thereby able to execute a process (instanced by demodulating and decoding) of receiving information contained in the shortened TTI in a shorter length of time than the normal TTI, and to shorten the processing delay. A signal of the shortened TTI illustrated in FIG. 2B and a signal of the normal TTI can be multiplexed (e.g., OFDM multiplexing) by the same CC (Component Carrier), whereby the compatibility with the normal TTI can be maintained.

(Setting Example of Shortened TTI)

A setting example of the shortened TTI will be described. When applying the shortened TTI, such a configuration is also available wherein both of the normal TTI and the shortened TTI are set in the user equipment in order to have the compatibility with LTE Rel.8-12. FIGS. 3A, 3B, and 3C are diagrams illustrating the setting examples of the normal TTI and the shortened TTI. Note that FIGS. 3A, 3B, and 3C simply illustrate exemplifications, but the embodiment is not limited to these exemplifications.

FIG. 3A is a diagram illustrating a first setting example. As depicted in FIG. 3A, the normal TTIs and the shortened TTIs may coexist timewise within the same component carrier (CC) (frequency domain).

Specifically, the shortened TTI may be set in a specified subframe (or a specified radio frame) of the same CC. For example, with the same CC in FIG. 3A, the shortened TTI is set in 5 consecutive subframes, and the normal TTIs are set in other subframes. Note that a number and positions of the subframes in which to set the shortened TTI are not limited to those illustrated in FIG. 3A.

FIG. 3B is a diagram illustrating a second setting example of the shortened TTI. As depicted in FIG. 3B, carrier aggregation (CA) or dual connectivity (DC) may also be implemented by integrating the CCs of the normal TTIs and the CC of the shortened TTI.

The CA is defined as a method used for the communications by integrating the component carriers (CCs) configured with an LTE Rel.8 system bandwidth being one unit. The DC is a method of performing the communications with the user equipment in a way wherein each of plural wireless base stations configures a cell group (CG). Each cell group is configured by at least one cell (CC).

To be specific, the shortened TTI may also be set in the specified CC (more specifically, the DL and/or UL of the specified CC). For example, in FIG. 3B, the shortened TTI is set in the DL of the specified CC, while the normal TTIs are set in the DL and the UL of other CCs. Note that the number and the positions of the CCs in which to set the shortened TTIs are not limited to those illustrated in FIG. 3B.

The CA allows the shortened TTI to be set in the specified CC (a primary (P) cell and/or secondary (S) cell) of the same wireless base station. By contrast, the DC allows the shortened TTI to be set in the specified CC (P cell and/or S cell) within a master cell group (MCG) configured by a master base station and also in a specified CC (primary secondary (PS) cell and/or S cell) within a secondary group (SCG) configured by a secondary base station.

FIG. 3C is a diagram illustrating a third setting example of the shortened TTI. As depicted in FIG. 3C, the shortened TTI may be set in any one of the DL and the UL. For example, FIG. 3C illustrates an example wherein the normal TTI is set in the UL, while the shortened TTI is set in the DL in a TDD (Time Division Duplex) system.

By the way, when the plurality of component carriers (CCs) are carrier-aggregated, this scheme is supported by control using Cross Carrier Scheduling (CCS). According to the CCS between the CC, the user equipment is able to control the CC for transmitting and receiving (communicating) PDSCH (Physical Downlink Shared Channel; downlink data) and PUSCH (Physical Uplink Shared Channel; uplink data) in the CC for receiving a downlink control signal by using PDCCH (Physical Downlink Control Channel) and EPDCCH (Enhanced Physical Downlink Control Channel).

In an environment encompassing coexistence of the CCs having differing TTI lengths, the TTI length differs depending on a scheduling cell and a scheduled cell as the case may be. The conventional CCS does not take a difference in TTI between the CCs into consideration, and hence the UE operates based on the scheduling unintended by an eNB (evolved Node B; wireless base station), resulting in an issue of preventing proper communications from being performed.

In view of these points, the present inventors devised an eNB/UE control method which was conceived not to cause any discrepancy in scheduling between the eNB and the UE even when conducting the CCS under the environment encompassing the coexistence of the CCS having the different TTI lengths. According to one embodiment of the present invention, the eNB/UE are enabled to conduct CCS by grasping timings about the CCS (e.g., data transmission/reception timings to be scheduled, and a downlink control information reception timing to be scheduled) in a way that takes into account the difference in TTI length between the respective CCs.

An in-depth description of the embodiment of the present invention will hereinafter be made. Note that the following discussion will be made by exemplifying 1 ms (one subframe) as the TTI of the existing LTE system, and 0.5 ms (0.5 subframe) and 0.25 ms (0.25 subframe) as the shortened TTIs, but the embodiment is not limited to these values of the shortened TTIs. It may be sufficient that the shortened TTI is shorter than the normal TTI of the existing LTE system, and may be set to values other than 0.25 ms and 0.5 ms, i.e., can be set to, e.g., 0.1 ms, 0.2 ms, 0.4 ms, 0.6 ms, 0.75 ms, 0.8 ms or other equivalent values.

Figure 4:
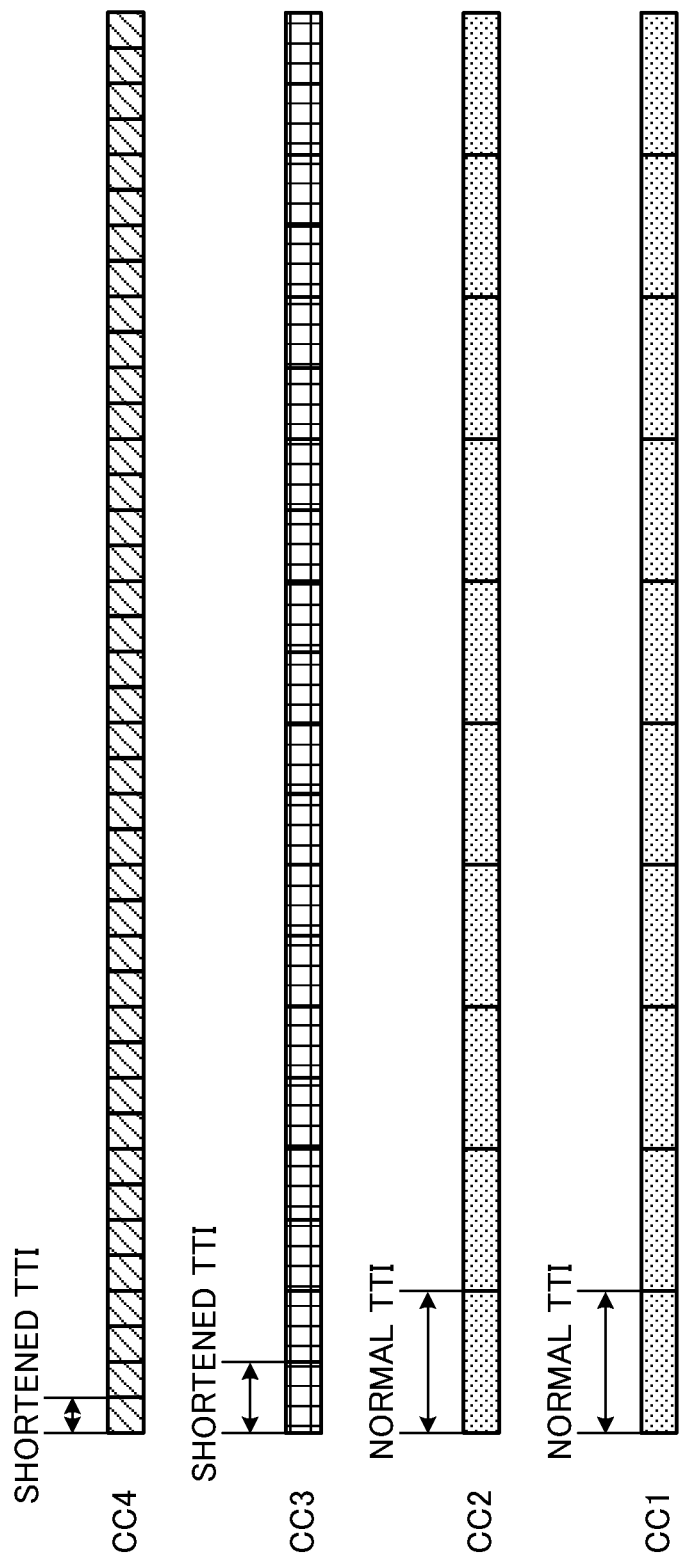
FIG. 4 is a diagram illustrating one example of a CA (Carrier Aggregation) when the TTIs having three types of TTI lengths are allocated to 4CCs.

Each embodiment will describe an example in which the CA using the 4 CCs (CC1 to CC4) illustrated in FIG. 4 is set in the UE. FIG. 4 is an example of such a CA wherein the 4 CCs are allocated with the TTIs having three types of TTI lengths. FIG. 4 illustrates the example wherein the CC1 and the CC2 use the normal TTI (1 ms); the CC3 uses the shortened TTI (e.g., 0.5 ms) shorter then the normal TTI; and the CC4 employs the shortened TTI (e.g., 0.25 ms) shorter than the TTI of the CC3. Note that the CC count and the TTI lengths of the respective CCs, which are set in the user equipment (UE), are not limited to these values. For example, the same TTI may also be set for the three or more CCs.

The short TTI contained in a time interval of the long TTI is expressed as "a short TTI corresponding to a long TTI", while the long TTI containing a time interval of the short TTI is expressed as "the long TTI corresponding to the short TTI". A head TTI in the CC of the short TTI corresponding to the time interval of a predetermined TTI of the CC of the long TTI, is simply expressed as the "head TTI".

The following discussion assumes a DCI (Downlink Control Information) notified via, e.g., the PDCCH and EPDCCH as downlink control information, but the embodiment is not limited to this information. For example, the PDSCH is assumed as the downlink data, but the embodiment is not limited to this channel. Further, e.g., the PUSCH is assumed as the uplink data, but the embodiment is not limited to this channel.

In the following discussion, a transmission unitary parameter of the time length shorter than the normal TTI (1 ms), is called the shortened TTI, but the embodiment is not limited to this nomenclature. Wireless communication systems, to which the shortened TTI is applied, may be referred to as 5G (5th generation mobile communication system), New-RAT (Radio Access Technology) and LTE-beyond. The following discussion will exemplify the LTE system, but applications of the present invention are not limited to this system. The present invention is applicable to any type of communication system encompassing the coexistence of the plurality of CCs having the different TTI lengths.

First Embodiment

A first embodiment will describe an example (DL CCS) wherein the user equipment controls reception of the downlink data of another cell different from the cell to which the downlink control information is transmitted, based on this downlink control information transmitted from a transmission point (the wireless base station and other equivalent points).

According to the first embodiment, the TTI in which to dispose a radio resource of the downlink control information and the TTI in which to dispose a radio resource of the downlink data are cross-carrier-scheduled on the TTI corresponding to the longer TTI of these two TTIs. In other words, the TTI at which the user equipment receives the downlink control information is overlapped with (corresponds to) the TTI at which the user equipment receives the downlink signal.

The first embodiment will hereinafter be described by being roughly separated into three examples (Embodiments 1.1 through 1.3) in terms of a relationship between the TTI lengths configuring the two CCs pertaining to the CCS.

Embodiment 1.1

An embodiment 1.1 according to the first embodiment will describe an example in which the CCS is applied in the way of being limited to between the CCs having the same TTIs.

In the embodiment 1.1, the CCs are classified into groups each configured to include the plural CCs delimited by the TTI length. The group concerned may be called, e.g., a cell group (CG) or an identical TTI group. The means by which the CCs configuring the CA are classified into the foregoing groups (A correspondence relationship between the CCs and the group) may be set (configured) from the base station on the basis of higher layer signaling instanced by RRC (Radio Resource Control), and may also be determined without signaling in particular based on the TTI length of the CC.

Figure 5:
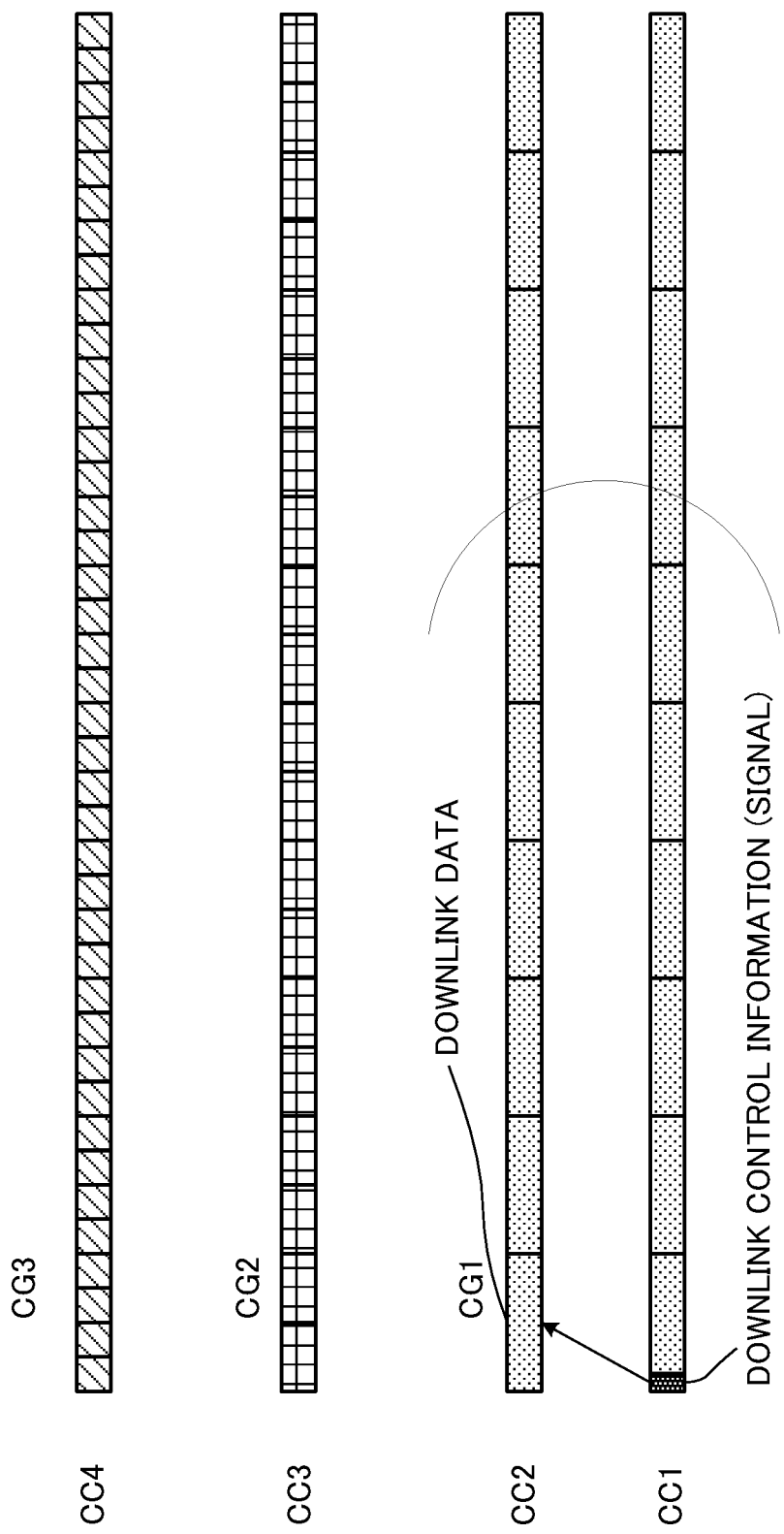
FIG. 5 is a schematic diagram of CCS (Cross Carrier Scheduling) according to an embodiment 1.1.

In other words, according to the embodiment 1.1, the CC having the different TTI length is to belong to the difference CG. FIG. 5 is a schematic diagram of the CCS according to the embodiment 1.1. FIG. 5 illustrates one example of the CG set for the CCs when the CCs having a plurality of different TTI lengths coexist, in which the four CCs are classified into three CGs. To be specific, the CC1 and the CC2 having the same TTI length are classified into CG1; the CC3 is classified into CG2; and the CC4 is classified into CG3.

In the embodiment 1.1, the user equipment assumes that the CCS is not implemented among the CCs belonging to the different CGs. Specifically, the user equipment assumes that the CCS is implemented only within the same CG, and the CG to which the CCs receiving the downlink control information belong is coincident with the CG to which the CCs receiving the downlink data belong, based on the downlink control information.

For example, in FIG. 5, the CCS can be implemented between the CC1 and the CC2 belonging to the CG1. In this case, the user equipment receives the downlink control information at the CC (Scheduling CC) (e.g., the CC1) via which the base station transmits the downlink control information.

The user equipment receives the downlink data transmitted by the base station at the CC (Scheduling CC) (e.g., the CC2) of a CCS destination specified by an item of downlink control information (DL assignment) contained in the downlink control information (DCI). For example, the wireless base station can indicate, to the user equipment, the cells associated with respective items of downlink control information by using a CIF (Carrier Indicator Field).

Thus, the embodiment 1.1 enables the CCS (Cross Carrier Scheduling) to be implemented only within the CG grouped by the CCs having the same TTI lengths even when the shortened TTIs and the normal TTIs coexist. Intricacy of controlling the CCS can be thereby restrained in the CA including the CCs having the different TTI lengths.

Note that the TTI of the CC (Scheduling CC) receiving the downlink control information is different from the TTI of the CC (Scheduled CC) indicated by the CIF contained in the downlink control information, in which case the user equipment deems this downlink control information invalid, and may control not to receive the data (PDSCH) based on the downlink control information When the downlink control information is thus determined invalid, the user equipment may generate and transmit a NACK bit as acknowledgement information (ACK/NACK (Negative ACK)) associated with the data (PDSCH) being scheduled based on the downlink control information, and may also control not to transmit the acknowledgement information itself. When generating and transmitting the NACK bit, the wireless base station recognizes the data with the invalid scheduling being implemented, and can properly perform retransmission thereof. When controlling not to transmit the acknowledgement information (ACK/NACK) itself, it is feasible to avoid transmitting the uplink control information when implementing the invalid scheduling, and hence an unpreferable increase in overhead of the uplink can be prevented.

Embodiment 1.2

An embodiment 1.2 and an embodiment 1.3 will describe the CCS of the downlink between the CCs having the different TTI lengths. The embodiment 1.2 will describe an example wherein the user equipment receives the downlink data at the CC having the short TTI length, based on the downlink control information received at the CC having the long TTI length.

Described below are the two TTIs having different TTI lengths, i.e., a (relatively) long TTI length and a (relatively) short TTI length.

Figure 6:
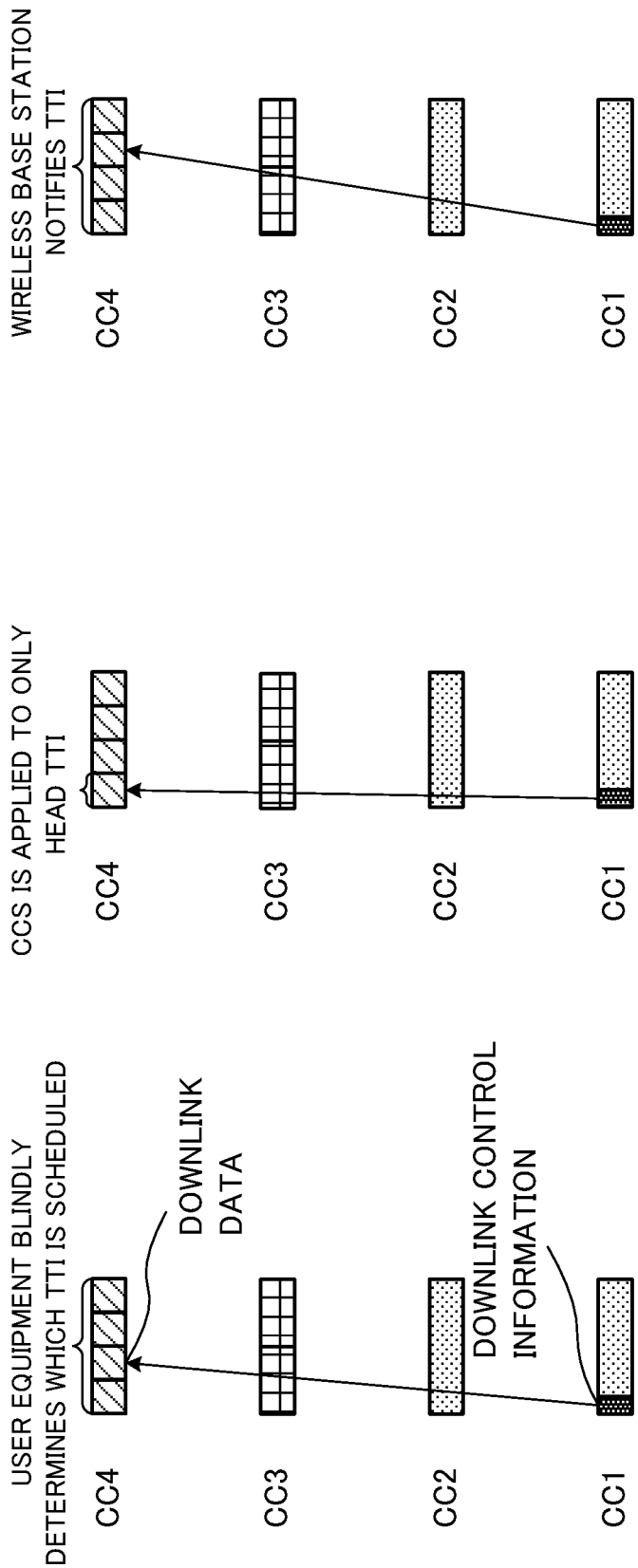
FIGS. 6A to 6C are schematic diagrams of the CCS according to an embodiment 1.2.

FIGS. 6A, 6B, and 6C are a schematic diagrams of the CCS according to the embodiment 1.2. FIGS. 6A, 6B, and 6C illustrate an example wherein the user equipment receives the downlink data at the CC4, based on the downlink control information received at the CC1. FIGS. 6A, 6B, and 6C also depict radio resources of the CC1 to CC4 at the CCS timing.

When receiving the downlink data at the CC4 having the short TTI length on the basis of the downlink control information received at the CC1 having the long TTI length, the user equipment is able to control the reception operation by utilizing any one of three types of methods. A first method (1) involves attempting to receive the downlink data at the plural short TTIs corresponding to the long TTIs. A second method (2) involves trying to receive the downlink data at the head TTI of the short TTIs corresponding to the long TTIs. Alternatively, a third method (3) involves trying to receive the downlink data at the TTI, designated by the wireless base station, of the short TTIs corresponding to the long TTIs.

An example (1) wherein the user equipment attempts to receive the downlink data at the short TTIs corresponding to the long TTIs, will be described with reference to FIG. 6A.

The wireless base station notifies the user equipment that the downlink data is scheduled (allocated) to the CC4 (e.g., 1 TTI of the CC4) by using the downlink control information. The wireless base station notifies the user equipment not of information for specifying the TTI, to which the downlink data is scheduled (allocated), of the 4 TTIs of the CC4, but of the scheduled CC (which is herein the CC4) and the resources. In this case, the wireless base station may simply cause the downlink control information to contain an item of CC information (e.g., the CIF), and is thereby able to restrain the rise in overhead of the downlink control information.

On the other hand, the user equipment is unable to determine which TTI of the 4 TTIs of the CC4 the downlink data is allocated to, and therefore blindly determines all of the 4 short TTIs of the CC4, which correspond to the long TTIs of the CC1.

In other words, the user equipment assumes that the downlink data is scheduled to any one of the 4 TTIs of the CC4, and attempts to receive the downlink data at all of the 4 TTIs of the CC4. As a result of blind-decoding the received data, the user equipment determines that the downlink data passing a CRC (Cyclic Redundancy Check) is the downlink data transmitted toward the self user equipment. For example, in FIG. 6A, the user equipment attempts to receive the downlink data at all of the 4 TTIs of the CC4, and consequently receives the downlink data at the second TTI of the CC4.

Subsequently, the user equipment transmits the acknowledgement information (HARQ-ACK) corresponding to a result of receiving the downlink data to the wireless base station. In the example illustrated in FIG. 6A, the user equipment receives the downlink data at the second TTI counted from the head of the CC4. The user equipment therefore transmits the acknowledgement information (ACK/NACK) as ACK. The user equipment, when decoding the 4 TTIs of the CC4 on the basis of the downlink control information received at the CC1 but being unable to receive the downlink data also at every TTI of the CC4, may transmit the NACK on the presumption that the scheduled downlink data is unable to be received.

Note that the method (1) enables the downlink data to be also scheduled to the short TTIs. In the example of FIG. 6A, when attempting to receive the downlink data at all of the 4 TTIs of the CC4 on the basis of the downlink control information and passing the CRC at the two or more TTIs, the user equipment may allocate the acknowledgement information individually to plural items of data as the pieces of acknowledgement information.

The plural pieces of acknowledgement information may be transmitted batchwise by bundling the acknowledgement information. When applying the bundling to the acknowledgement information, e.g., even one piece of information of the plural pieces of acknowledgement information is NACK, the whole of the acknowledgement information may be deemed to be NACK. Thus, a bit count of the acknowledgement information to be transmitted can be reduced by bundling the pieces of acknowledgement information, thereby making it possible to relieve the load on the user equipment and the wireless base station and also the overhead of the uplink radio resources.

An example wherein the user equipment attempts to receive the downlink data at the head TTI of the short TTIs corresponding to the long TTIs will be described with reference to FIG. 6B.

The wireless base station notifies the user equipment that the downlink data is scheduled to the CC4 (e.g., 1 TTI of the CC4) by using the downlink control information. The wireless base station notifies the user equipment not of the information for specifying the TTI, to which the downlink data is scheduled, of the TTIs of the CC4, but of the scheduled CC (which is herein the CC4) and the resources. In this case, the wireless base station may simply cause the downlink control information to contain the item of CC information (e.g., the CIF), and is thereby able to restrain the rise in overhead of the downlink control information.

The wireless base station transmits the downlink data at the first TTI of the CC4, which is overlapped with the TTI at which to receive the downlink control information in the CC1.

The user equipment assumes that the downlink data is scheduled to the head TTI of the 4 TTIs of the CC4, which correspond to the long TTIs, and decodes the downlink data at the head TTI of the CC4.

Subsequently, the user equipment transmits the acknowledgement information matching with a reception state of the downlink data to the wireless base station. In the example illustrated in FIG. 6B, the user equipment can receive the downlink data at the head TTI of the CC4, and hence transmits the acknowledgement information as the ACK to the wireless base station. The user equipment, when decoding the head TTI of the CC4 on the basis of the downlink control information received in the CC1 but being unable to receive the downlink data at the head TTI of the CC4, may transmit the NACK.

Thus, in the method (2) according to the embodiment 1.2, the user equipment may simply receive the downlink data at the head TTI, whereby a data detection load can be restrained from rising. In other words, the user equipment is enabled not to control the reception of the downlink data at the short TTIs from the second TTI onward.

Note that the example of allocating the data to the head TTI has been described in FIG. 6B, but the embodiment is not limited to this example. For example, it may be set beforehand between the wireless base station and the user equipment that the downlink data is scheduled to the specified TTI of the target CC (CC4). Herein, the specified TTI may be the head TTI and may also be the second TTI, and it may further be set (configured) for each user equipment to indicate which TTI is the specified TTI by the higher layer signaling as instanced by the RRC.

Such an example will be described with reference to FIG. 6C wherein (3) the user equipment attempts to receive the downlink data at the TTI, specified by the wireless base station, of the short TTIs corresponding to the long TTIs.

The wireless base station notifies the user equipment that the downlink data is scheduled to the CC4 (e.g., 1 TTI of the CC4) by using the downlink control information. The wireless base station gives the notification by causing the downlink control information to contain the information indicating the TTI, to which the downlink data is scheduled, of the TTIs of the CC4. To be specific, the downlink control information contains the scheduled CC (which is herein the CC4), the resources and the information pertaining to the TTI to which the (downlink) data is scheduled. The information pertaining to the TTI may be a value indicating the number of the TTI, and may also be a bit string (bitmap) indicating whether the scheduling of the respective TTIs corresponding to the long TTIs is implemented or not.

The user equipment is therefore able to specify, based on the information pertaining to the TTI, which TTI (of at least one CC4) the downlink data is allocated to in the 4 TTIs of the CC4 that correspond to the long TTIs of the CC1.

The user equipment decodes the downlink data at the TTI, specified by the downlink control information notified from the wireless base station, of the short 4 TTIs of the CC4. For example, in FIG. 6C, the user equipment receives the downlink data at the third TTI counted from the head of the CC4, based on the information pertaining to the TTI.

Subsequently, the user equipment transmits, to the wireless base station, the acknowledgement information matching with the result of receiving the downlink data of the TTI specified by the information pertaining to the TTI. In the example illustrated in FIGS. 6A, 6B, and 6C, the user equipment receives the downlink data at the third TTI counted from the head TTI of the CC4. Therefore, the user equipment transmits the acknowledgement information as ACK to the wireless base station. The user equipment may transmit the NACK when decoding the specified TTI of the CC4 on the basis of the downlink control information received at the CC1 but being unable to receive the downlink data at this specified TTI.

Note that the plural TTIs may be designated as the TTIs at which the user equipment attempts to receive the downlink data. In other words, the wireless base station may transmit the downlink data at the plural TTIs. For example, the wireless base station may also designate the TTI, to which the downlink data is scheduled, of the four TTIs by the bit string (bitmap) being "4" in length.

When the downlink data is allocated to the plural TTIs, the acknowledgement information may be allocated individually to plural items of data as the pieces of acknowledgement information. The plural pieces of acknowledgement information may be transmitted batchwise by bundling the acknowledgement information. When applying the bundling to the acknowledgement information, e.g., even one piece of information of the plural pieces of acknowledgement information is NACK, the whole of the acknowledgement information may be deemed to be NACK. Thus, the bit count of the acknowledgement information to be transmitted can be reduced by bundling the pieces of acknowledgement information, thereby making it possible to relieve the load on the user equipment and the wireless base station and also the overhead of the uplink radio resources.

Thus, in the method (3) according to the embodiment 1.2, the user equipment receives the downlink data at the TTI that is explicitly notified from the wireless base station. The user equipment is thereby able to preferably execute the reception process at the TTI to which the data is scheduled.

As discussed above, the embodiment 1.2 enables the user equipment to receive the downlink data at the CC having the short TTIs, based on the downlink control information received at the CC having the long TTIs.

Embodiment 1.3

An embodiment 1.3 will describe an example wherein the user equipment receives the downlink data at the CC having the long TTIs, based on the downlink control information received at the CC having the short TTIs.

Figure 7:
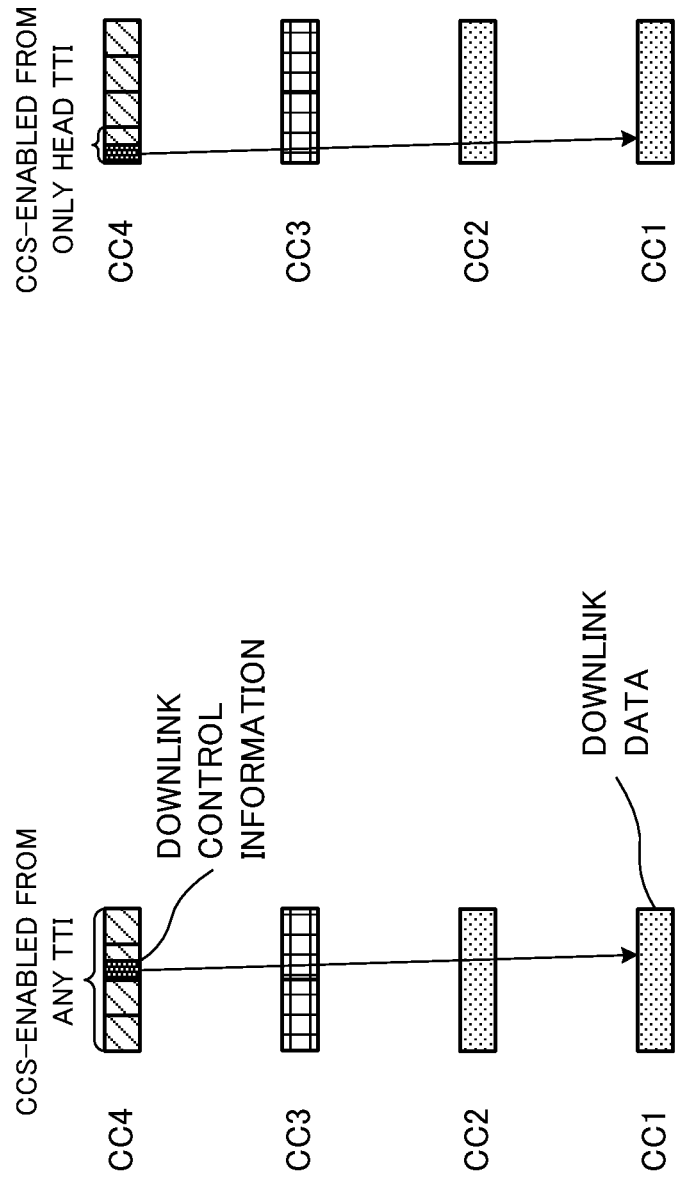
FIGS. 7A and 7B are schematic diagrams of the CCS according to an embodiment 1.3.

FIG. 7 is a schematic diagram of the CCS according to the embodiment 1.3. FIG. 7 illustrates an example wherein the user equipment receives the downlink data at the CC1, based on the downlink control information received at the CC4. Note that FIG. 7 depicts part of scheduling of the radio resources of the CC1 to CC4.

When receiving the downlink data at the CC1 having the long TTI length, based on the downlink control information received at the CC4 having the short TTI length, the user equipment is able to control the reception operation by utilizing any one of two methods given below. One method corresponds to an example of attempting to receive the downlink control information by using an arbitrary TTI as the TTI of the CC4 employed for receiving the downlink control information, while another method corresponds to an example of attempting to receive the downlink control information by using the head TTI as the TTI of the CC4 used for receiving the downlink control information.

An example wherein the user equipment attempts to receive the downlink control information by using an arbitrary TTI as the TTI of the CC4 used for receiving the downlink control information, will be described with reference to FIG. 7A. In this example, the downlink control information in the CC4 may be scheduled to the arbitrary TTI of the CC4. Specifically, the wireless base station transmits the downlink control information at the arbitrary TTI of the CC4 to the user equipment.

The user equipment assumes that the downlink control information is scheduled to any of the 4 TTIs of the CC4, then tries to receive the downlink control information at all of the 4 TTIs concerned, and performs blind decoding. As a result of performing blind decoding, the user equipment determines that the signal passing the CRC corresponds to the downlink control information addressed to the self user equipment.

When receiving the downlink control information at any of the TTIs of the CC4, the user equipment receives the downlink data scheduled to the CC1 on the basis of the downlink control information. Note that when receiving different types of downlink control information containing the scheduling information to the CC1 as instanced by resource allocation and Modulation and Coding Scheme (MCS) index at the TTIs of the CC4, the user equipment uses the downlink control information received at the newest (latest) TTI. The user equipment receives the downlink data, based on the downlink control information concerned.

In the example illustrated in FIG. 7A, the user equipment receives the downlink control information at the third TTI counted from the head of the CC4. The user equipment receives the downlink control information, and receives the downlink data via the radio resources based on the downlink control information. In other words, the user equipment receives the downlink data at the (first) TTI of the CC of the long TTIs, which is overlapped with the TTI at which to receive the downlink control information in the CC of the short TTIs.

Subsequently, the user equipment transmits the acknowledgement information matching with the result of receiving the downlink data to the wireless base station. In the example illustrated in FIG. 7A, the user equipment can receive the downlink data at the third TTI counted from the head of the CC4, and therefore transmits the acknowledgement information as ACK to the wireless base station.

An example wherein the user equipment attempts to receive the downlink control information by using the head TTI will be described with reference to FIG. 7B. In this example, the downlink control information indicating the Cross Carrier Scheduling (CCS) to the CC1 in the CC4 may be scheduled to the head TTI of the CC4. To be specific, the wireless base station transmits the downlink control information at the head TTI of the CC4 to the user equipment.

The user equipment attempts to receive the downlink control information at the head TTI concerned on the assumption that the downlink control information indicating the Cross Carrier Scheduling to the CC1 is scheduled to the head TTI of the CC4, and performs blind decoding. In other words, the TTI at which the user equipment receives the downlink control information in the CC4 is the first TTI overlapped with the TTI of the CC1. As a result of performing blind decoding, the user equipment determines that the signal passing the CRC corresponds to the downlink control information addressed to the self user equipment.

For example, in FIG. 7B, when receiving the downlink control information indicating the Cross Carrier Scheduling to the CC1 at the head TTI of the CC4, the user equipment receives the downlink data scheduled to the CC1, based on the downlink control information. In this case, the user equipment assumes that the downlink control information indicating the Cross Carrier Scheduling to the CC1 is not scheduled to any TTI other than the head TTI of the CC4, and may not therefore monitor the downlink control information indicating the Cross Carrier Scheduling to the CC1 with respect to the TTIs from the second TTI onward counted from the head of the CC4.

Note that the user equipment may also receive the downlink control information indicating the Cross Carrier Scheduling to the CC1 with respect to the TTIs from the second TTI onward in the CC4. In this case, the user equipment may determine a misdetection of the downlink control information indicating the Cross Carrier Scheduling to the CC1, which is received at the TTIs from the second TTI onward in the CC4.

Such control may also be conducted such that the downlink control information not indicating the Cross Carrier Scheduling to the CC1 is also received at the TTIs from the second TTI onward in the CC4. For instance, the downlink control information indicating the scheduling to the CC4 can be scheduled to the second, third and fourth TTIs of the CC4, while the downlink control information indicating the scheduling to the CC3 can be scheduled to the third TTI of the CC3. The user equipment can perform the control as instanced by blind decoding of a control channel on the assumption that the downlink control information can be thus scheduled.

Successively, the user equipment transmits the acknowledgement information matching with the reception result of the received downlink data to the wireless base station. In the example illustrated in FIG. 7B, the user equipment is able to receive the downlink data at the head TTI of the CC4, and therefore transmits the acknowledgement information as ACK to the wireless base station.

Thus, the configuration wherein the downlink control information is allocated to only the head TTI makes it feasible to narrow a TTI range that entails being monitored for the user equipment to receive the downlink control information. The load of the user equipment can be thereby relieved.

As described above, according to the first embodiment, even when the CCs having the shortened TTIs and the CCs having the normal TTIs, the downlink data communication with the user equipment can be properly performed.

Second Embodiment

A second embodiment will describe an example wherein the user equipment controls the transmission of uplink data (UL CCS) of another cell, based on the downlink control information transmitted from a transmission point (the wireless base station, and other equivalent points).

The second embodiment will hereinafter be described by being roughly separated into three examples (Embodiments 2.1 through 2.3) in terms of a relationship between the TTI lengths configuring the two CCs pertaining to the CCS.

Embodiment 2.1

An embodiment 2.1 according to the second embodiment will describe an example in which the CCS is applied in the way of being limited to between the CCs having the same TTIs, similarly to the embodiment 1.1. Note that the discussion will focus on the points which are different from the embodiment 1.1, while omitting the repetitive explanations of the same components and operations as those in the embodiment 1.1.

Figure 8:
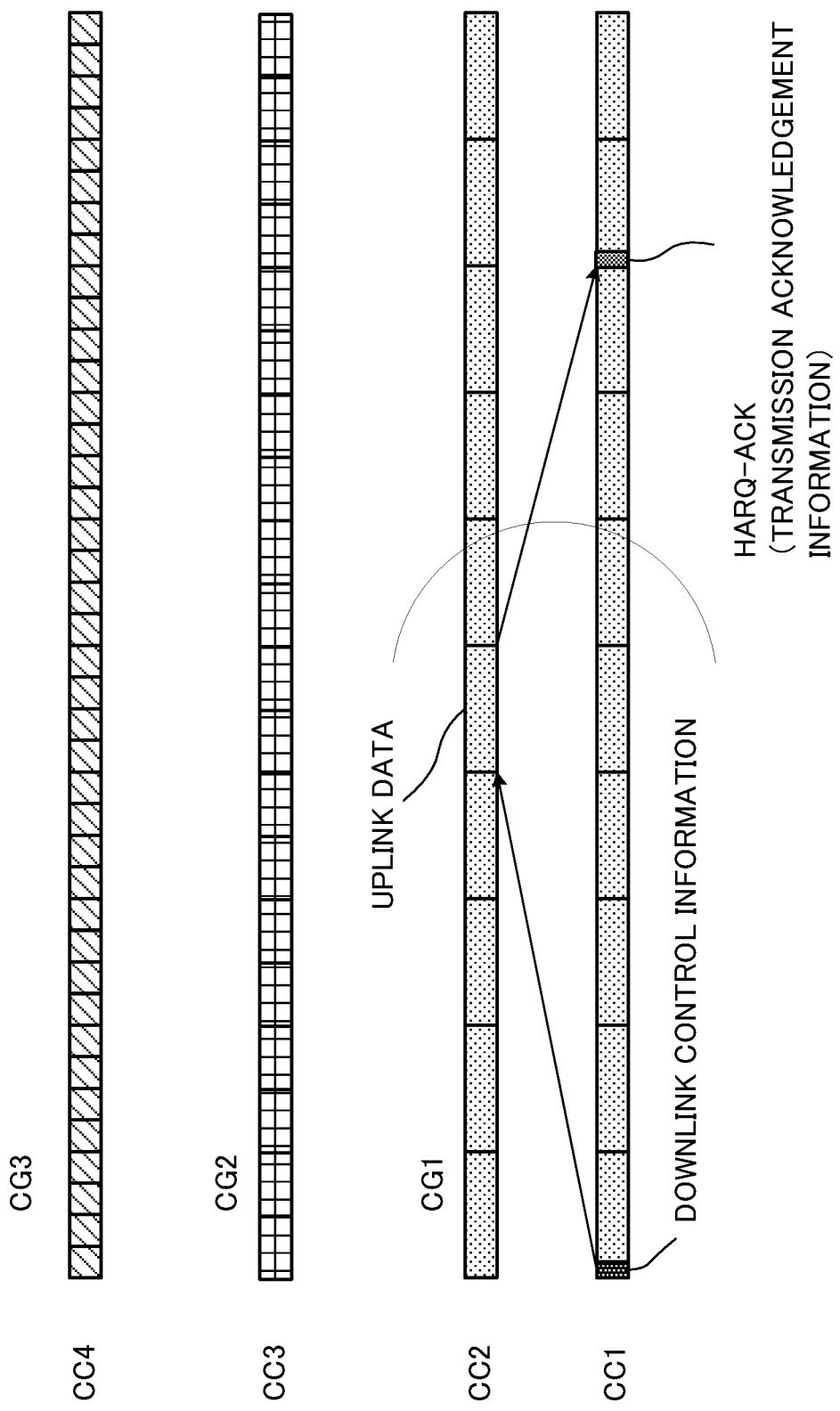
FIG. 8 is a schematic diagram of the CCS according to an embodiment 2.1.

FIG. 8 is a schematic diagram of the CCS according to the embodiment 2.1. In FIG. 8, the CCS can be carried out between the CC1 and the CC2. In this case, the user equipment receives the downlink control information in the CC (Scheduling CC) (e.g., the CC1) to which the wireless base station transmits the downlink control information.

The user equipment transmits the uplink data to the wireless base station after predetermined TTIs (e.g., after 4 TTIs in FIG. 8) from the TTI at which to receive the downlink control information in the CC (Scheduled CC) (e.g., the CC2) of a CCS destination specified by an item of downlink control information (e.g., UL grant) of the downlink control information abbreviated to DCI. For example, the wireless base station can indicate, to the user equipment, the cells associated with respective items of downlink control information by using a CIF (Carrier Indicator Field).

The user equipment receives acknowledgement information (HARQ-ACK, ACK/NACK) corresponding to a reception status of the uplink data of the wireless base station in the CC contained in the same CG via PHICH (Physical Hybrid-ARQ Indicator Channel), PDCCH and other equivalent channels. The user equipment receives the acknowledgement information after the predetermined TTIs (e.g., after the 4 TTIs in FIG. 8) from the TTI at which to transmit the uplink data. In other words, corresponding to an operation of the wireless base station, the user equipment controls to receive the acknowledgement information associated with the uplink data at the TTI of the CC1 after a length of time equivalent to an integral plural of the TTI length from the TTI at which to receive the downlink control information in the CC1.

Thus, the embodiment 2.1 enables the CCS (Cross Carrier Scheduling) to be implemented only within the CG grouped by the CCs having the same TTI lengths even when the shortened TTIs and the normal TTIs coexist. The intricacy of controlling the CCS can be thereby restrained in the CA including the CCs having the different TTI lengths.

Embodiment 2.2

An embodiment 2.2 and an embodiment 2.3 will describe the CCS of the uplink between the CCs having the different TTI lengths. The embodiment 2.2 will describe an example wherein the user equipment transmits the uplink data at the CC having the short TTI length, based on the downlink control information received at the CC having the long TTI length.

Figure 9:
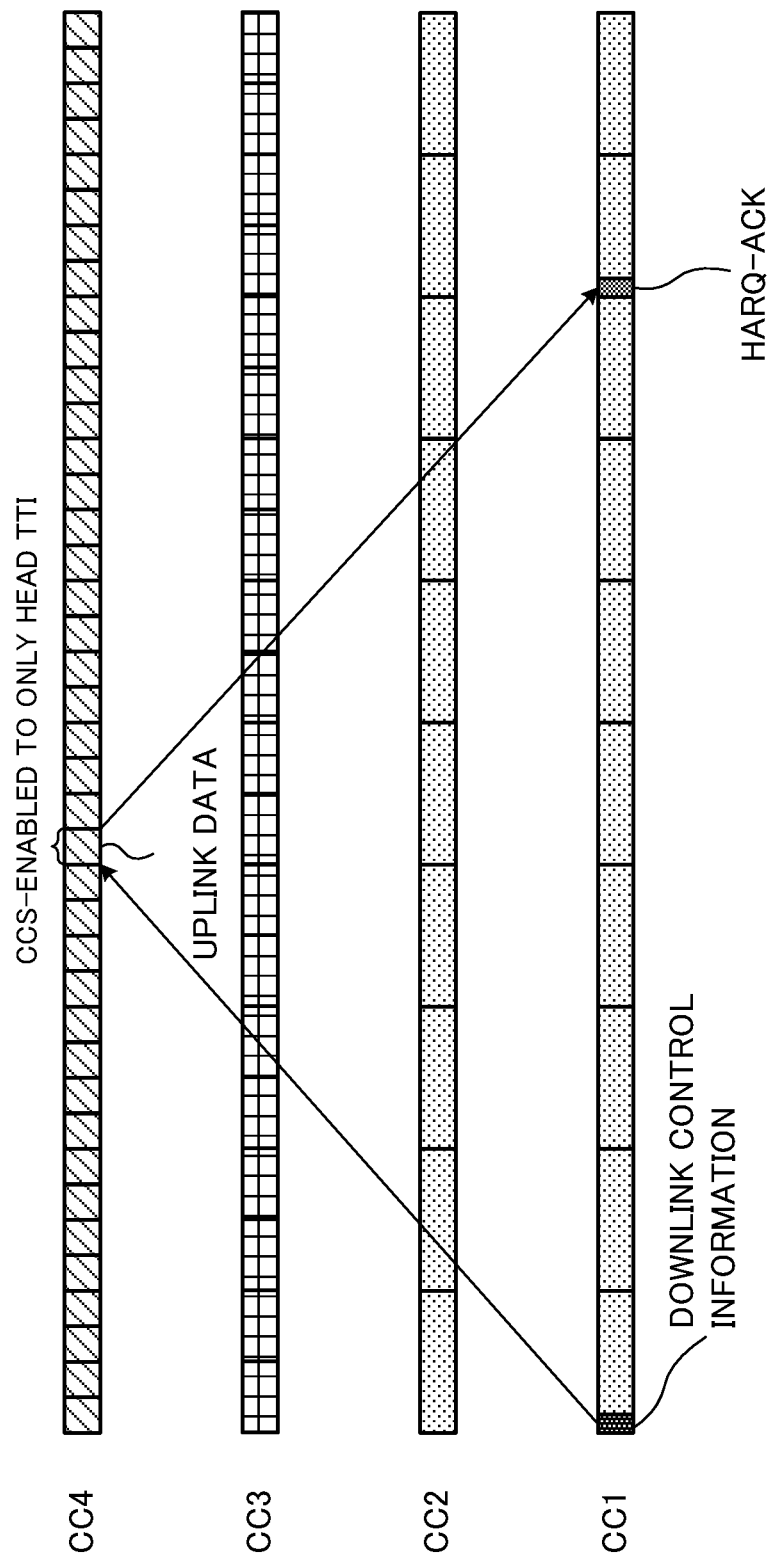
FIG. 9 is a schematic diagram of the CCS according to an embodiment 2.2.
Figure 10:
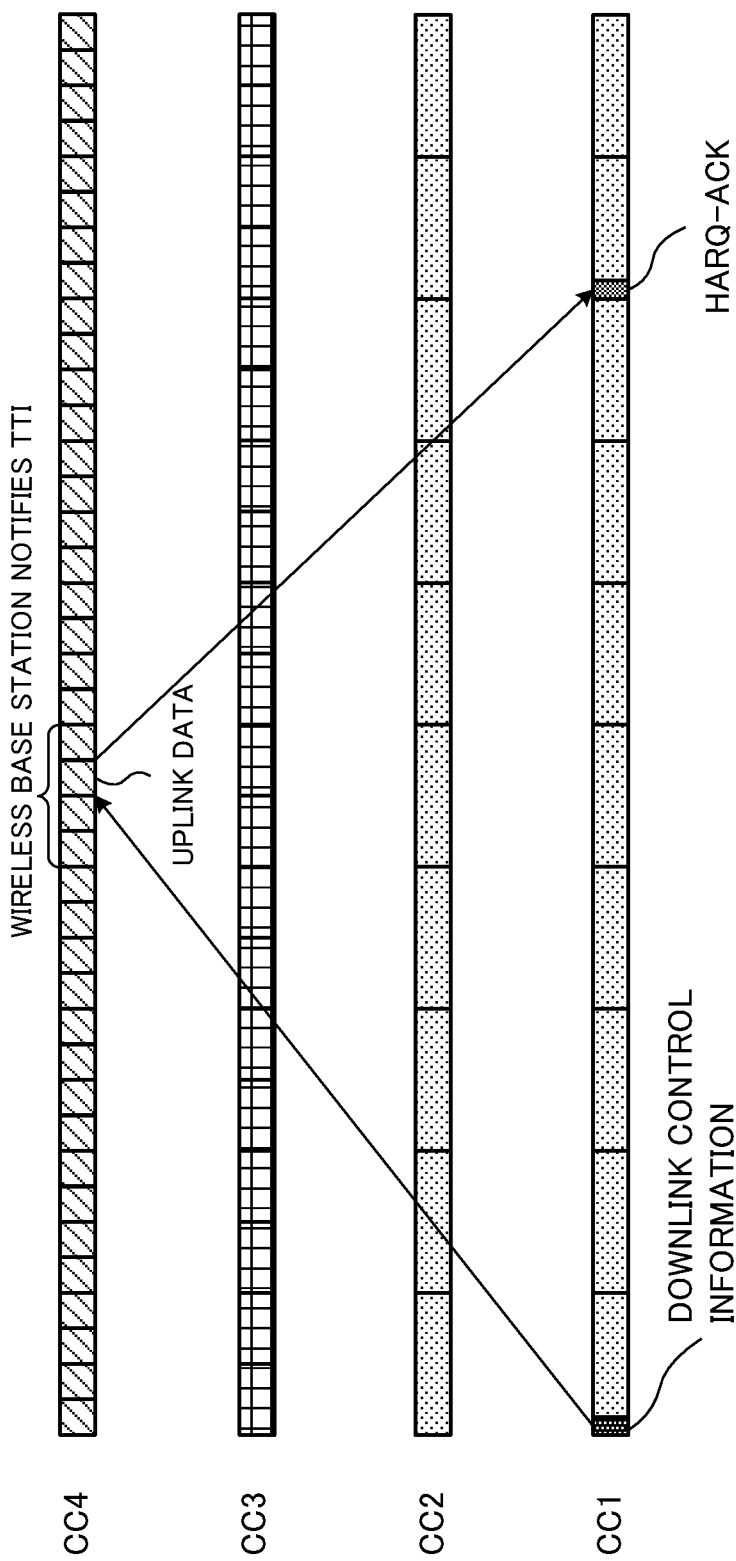
FIG. 10 is a schematic diagram of the CCS according to the embodiment 2.2.

FIGS. 9 and 10 are schematic diagrams of the CCS according to the embodiment 2.2. FIGS. 9 and 10 illustrate examples in which the user equipment transmits the uplink data at the CC4, based on the downlink control information received at the CC1.

When transmitting the uplink data at the CC4 having the long TTI lengths on the basis of the downlink control information received at the CC1 having the short TTI lengths, the user equipment is able to control a transmitting/receiving operation by utilizing any of two methods given below. One method corresponds to an example of attempting to transmit the uplink data at the head TTI of the short TTIs corresponding to the long TTIs, while another method corresponds to an example of attempting to transmit the uplink data by using the TTI, of which the wireless base station notifies, of the short TTIs corresponding to the long TTIs.

The example wherein the user equipment attempts to transmit the uplink data at the head TTI of the short TTIs corresponding to the long TTIs, will be described with reference to FIG. 9. In the following discussion according to the second embodiment, the "short TTI corresponding to the long TTI" is at least one of the TTIs of the second CC (e.g., the CC4), which are overlapped with the TTIs of the first CC after a predetermined length of time counted from the TTI at which to receive the downlink control information in the first CC (e.g., the CC1). The "predetermined length of time" indicates an integral plural (e.g., 4 TTIs) of the longer of two lengths, i.e., the TTI length of the first CC and the TTI length of the second CC.

In this case, the wireless base station notifies the user equipment that the uplink data is scheduled to the CC4 (e.g., 1 TTI of the CC4) by using the downlink control information. The wireless base station notifies the user equipment not of the information for specifying the TTI, to which the uplink data is scheduled, of the 4 TTIs of the CC4, but of the scheduled CC (which is herein the CC4) and the resources. In this instance, the wireless base station may simply cause the downlink control information to contain the item of CC information (e.g., the CIF), and is thereby able to restrain the rise in overhead of the downlink control information.

On the other hand, the user equipment does not have any information indicating which TTI of the CC4 the uplink data is allocated to. In this case, a setting may be previously set between the wireless base station and the user equipment such that the uplink data is scheduled to a specified TTI (e.g., the head TTI) of the target CC. To be specific, the user equipment may control to transmit the uplink data at the first TTI of the CC4, which is overlapped with the TTI of the CC1 after the predetermined length of time counted from the TTI at which to transmit the downlink control information in the CC1. For example, in FIG. 9, the user equipment transmits the uplink data at the TTI associated with the item of downlink control information of the CC4.

The wireless base station attempts to receive the uplink data at the head TTI of the CC4 on the assumption the uplink data is scheduled to the head TTI of the four TTIs configuring the CC4.

Note that the wireless base station in this case can allocate the uplink data of the CCS on the basis of the same downlink control information without depending on the TTI length of the CC for transmitting the uplink data. Concretely, it is not necessary for the wireless base station to indicate the TTI at which to transmit the uplink data in the CC for transmitting the uplink data, and hence the preferable information content does not vary depending on the TTI length of the CC. The wireless base station is thereby able to control the CCS for the CC having the different TTI lengths by employing the downlink control information having the same length.

Subsequently, the user equipment receives the acknowledgement information matching with the result of receiving the uplink data in the wireless base station. Hereat, the wireless base station transmits, to the user equipment, the acknowledgement information via PHICH, corresponding to the reception statue of the uplink data. In the example illustrated in FIG. 9, the wireless base station may transmit the acknowledgement information in the CC (CC1) at which to transmit the downlink control information after the 4 TTIs of the long TTIs from the TTI position of receiving the uplink data. Note that a PHICH resource may be calculated by a formula (equation) on the assumption that the TTI is the long TTI.

The discussion made above has described the example in which the specified TTI is the head TTI with reference to FIG. 9, but the specified TTI is not limited to the head TTI. The specified TTI may also be, e.g., the second TTI, and it may further be set (configured) for each user equipment to indicate which TTI is the specified TTI by the higher layer signaling as instanced by the RRC.

An example of attempting to transmit the uplink data by using the TTI, notified from the wireless base station, of the short TTIs corresponding to the long TTIs, will be described with reference to FIG. 10. FIG. 10 depicts the example in which the user equipment receives the downlink control information in the CC1, and transmits the uplink data at the TTI in the CC4 that is notified from the wireless base station.

In this case, the wireless base station gives the notification that the uplink data is scheduled to the TTI of the CC4 by using the downlink control information. The wireless base station gives the notification by causing the downlink control information to contain the information indicating the TTI, to which the uplink data is scheduled, of the TTIs of the CC4. In other words, the downlink control information contains the information about the TTI to which the (uplink) data is scheduled. The size of the information about the TTI, to which the data is scheduled, may differ corresponding to the TTI length of the scheduling CC and/or scheduled CC.

Accordingly, the user equipment has the information indicating which TTI of the 4 TTIs of the CC4 the uplink data is scheduled to, where the 4 TTIs correspond to the long TTIs of the CC1. To be specific, the user equipment specifies at least one of TTIs of the CC4, based on the information about the TTI to which the (uplink) data is scheduled.

The wireless base station attempts to receive the uplink data at the indicated TTI, to which the uplink data is scheduled, of the 4 TTIs configuring the CC4. For example, in FIG. 10, the wireless base station already knows the TTI to which the uplink data is scheduled in the CC4. In this case, the wireless base station receives the uplink data transmitted by the user equipment at the third TTI counted from the head of the corresponding short TTIs in the CC4.

The wireless base station transmits, to the user equipment, the acknowledgement information via the PHICH, corresponding to the reception state of the uplink data. In the example illustrated in FIG. 10, the wireless base station may also transmit the acknowledgement information in the CC (CC1) with the downlink control information being transmitted after the 4 TTIs of the long TTIs from the TTI position in which to transmit the downlink control information. Note that PHICH resources may involve applying an offset corresponding to the uplink data reception TTI (e.g., a TTI number, a subframe number, and other equivalent values) of the short TTIs so as not to cause a conflict of the PHICH resources between the user equipments, which are scheduled to different short TTIs of the 4 short TTIs corresponding to the long TTIs.

As described above, the embodiment 2.2 enables the user equipment to transmit the uplink data at the CC having the short TTIs, based on the downlink control information received at the CC having the long TTIs.

Embodiment 2.3

An embodiment 2.3 will describe an example wherein the user equipment transmits the uplink data at the CC having the long TTIs, based on the downlink control information received at the CC having the short TTIs.

Figure 11:
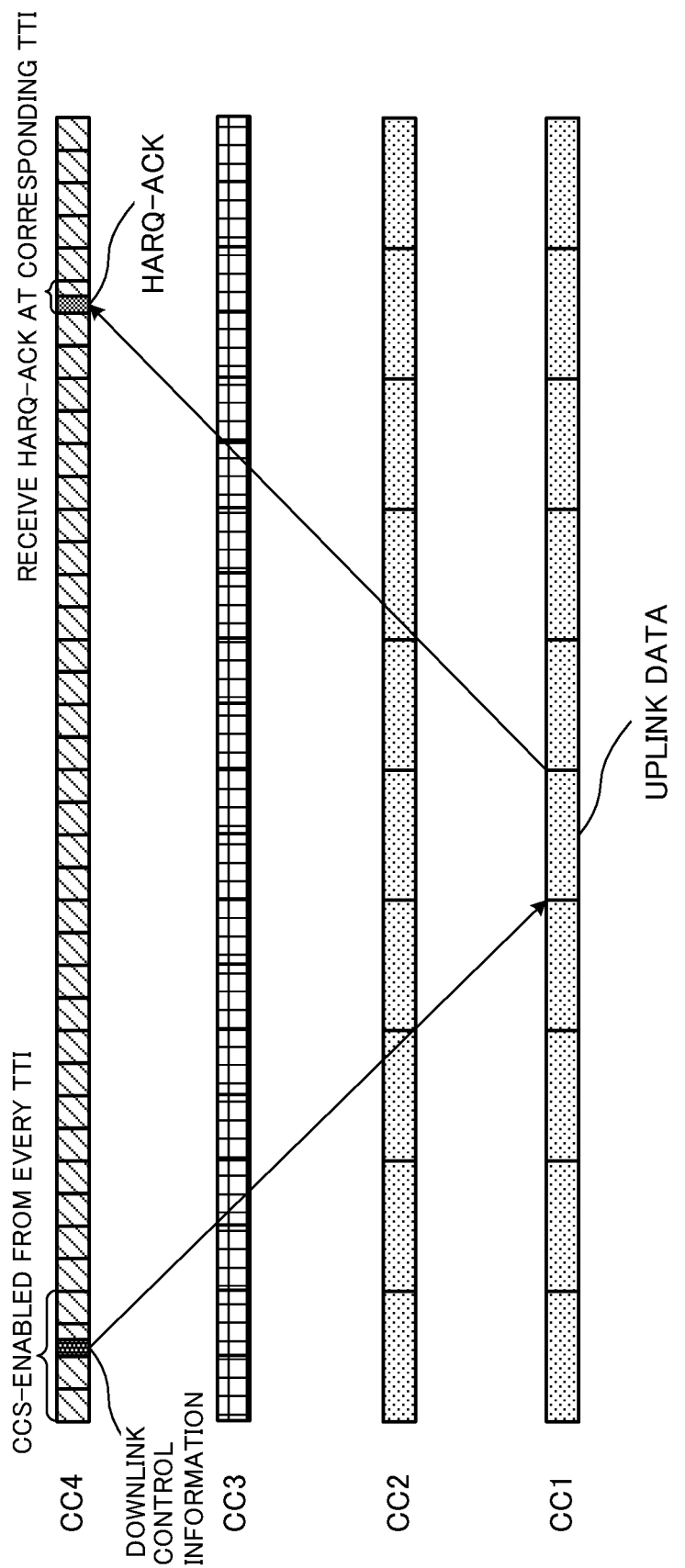
FIG. 11 is a schematic diagram of the CCS according to an embodiment 2.3.
Figure 12:
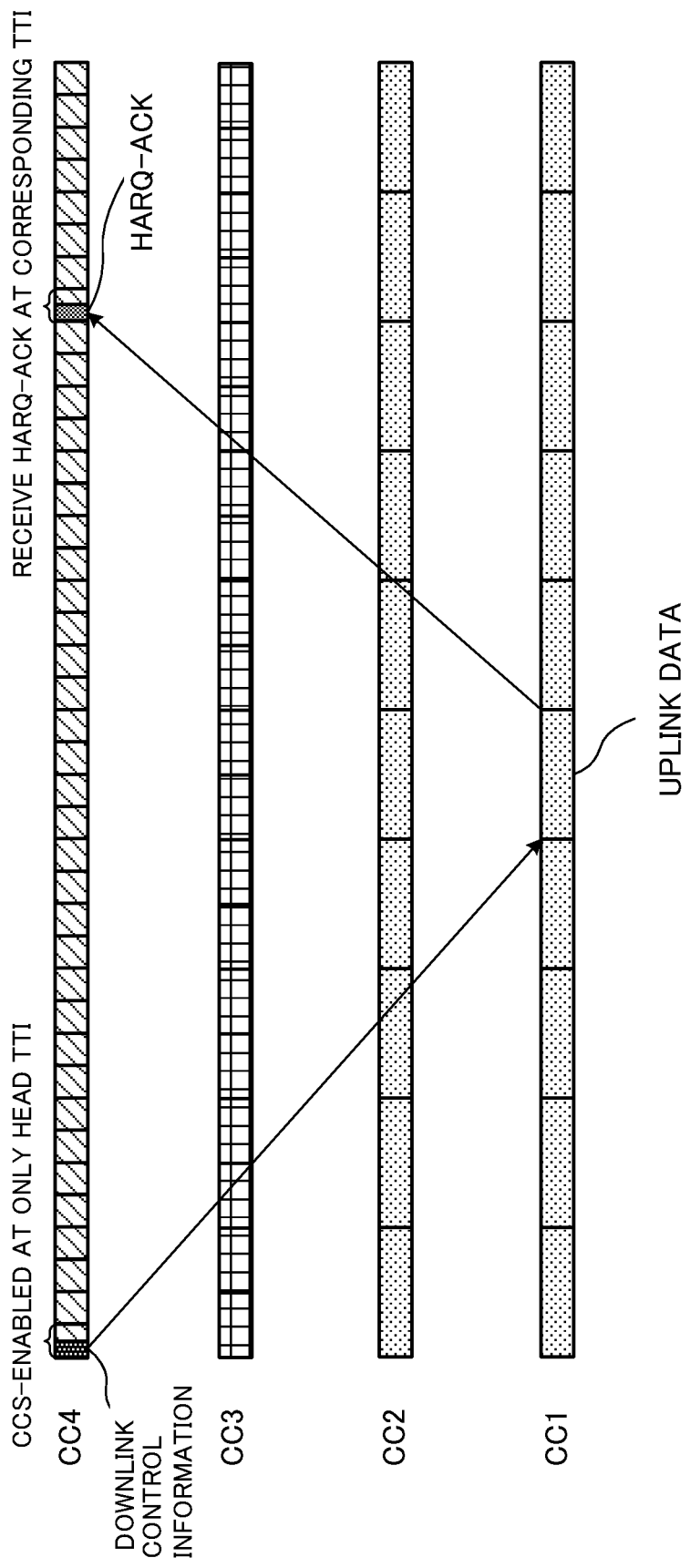
FIG. 12 is a schematic diagram of the CCS according to the embodiment 2.3.

FIGS. 11 and 12 are schematic diagrams of the CCS according to the embodiment 2.3. FIGS. 11 and 12 illustrate the example wherein the user equipment transmits the uplink data at the CC1, based on the downlink control information received at the CC4.

When transmitting the uplink data at the CC1 having the long TTI lengths on the basis of the downlink control information received at the CC4 having the short TTI lengths, the user equipment can control the reception operation by utilizing any of two methods that follow. One method corresponds to an example of attempting to transmit the uplink data by using an arbitrary TTI as the TTI of the CC4 employed for receiving the downlink control information, while another method corresponds to an example of attempting to transmit the uplink data by using the head TTI as the TTI of the CC4 used for receiving the downlink control information.

An example wherein the user equipment attempts to transmit the corresponding uplink data by using an arbitrary TTI as the TTI of the CC4 used for receiving the downlink control information will be described with reference to FIG. 11. In this example, the downlink control information in the CC4 may be scheduled to the arbitrary TTI of the CC4. Specifically, the user equipment receives the downlink control information at the arbitrary TTI from the wireless base station.

In the example illustrated in FIG. 11, the user equipment receives the downlink control information at the third TTI counted from the head TTI of the CC4. The wireless base station transmits the downlink control information, and receives the uplink data via the radio resource based on the downlink control information. Similarly to the embodiment 2.2, in the embodiment 2.3 also, the user equipment transmits the uplink data at the TTI after the 4 TTIs of the CC (CC1) having the long TTIs, which corresponds to the CC (CC4) having the short TTIs at which the user equipment receives the downlink control information.

Successively, the wireless base station transmits, to the user equipment, the acknowledgement information matching with the result of receiving the uplink data via the PHICH. The wireless base station controls to transmit the acknowledgement information associated with the uplink data at the TTI of the CC1 after a length of time equivalent to an integral multiple of the long TTI length from the TTI at which to transmit the downlink control information in the CC1.

In the example depicted in FIG. 11, the wireless base station transmits the downlink control information at the third TTI counted from the head TTI of the CC4 having the short TTIs. The wireless base station receives the uplink data after a length of time that is four times as large as the long TTI length. The wireless base station further transmits the acknowledgement information at the short TTI of the CC4, i.e., at the third TTI counted from the head TTI of the CC4 after the length of time equivalent to the integral multiple of the long TTI length from the position in which to transmit the downlink control information.

The operation being thus done, the user equipment is thereby able to determine that the acknowledgement information is scheduled to the TTI of the CC4 from the position on the TTI of the downlink control information scheduled to the CC4. It is therefore feasible to receive the acknowledgement information at the target TTI without any additional information. A load applied when the user equipment receives the acknowledgement information can be thereby reduced.

An example wherein the user equipment attempts to transmit the uplink data by using the head TTI as the TTI of the CC4 used for receiving the downlink control information, will be described with reference to FIG. 12. In this example, the downlink control information indicating the Cross Carrier Scheduling to the CC1 in the CC4 may be scheduled to the head TTI of the TTIs of the CC4. In other words, the user equipment receives the downlink control information indicating the Cross Carrier Scheduling to the CC1 at the head TTI of the CC4 to the wireless base station. The embodiment 2.3 corresponds to the example of scheduling the downlink control information indicating the Cross Carrier Scheduling to the CC1 only to the head TTI according to the embodiment 2.2.

In the example illustrated in FIG. 12, the user equipment receives the downlink control information indicating the Cross Carrier Scheduling to the CC1 at the head TTI of the CC4. The wireless base station transmits the downlink control information, and receives the uplink data via the radio resource of the CC (CC1) to be scheduled based on the downlink control information.

Specifically, in the operations of the wireless base station and the user equipment, the TTI at which the user equipment receives the downlink control information indicating the Cross Carrier Scheduling to the CC1 is the first TTI overlapped with the TTI of the CC4 (the second CC); and the TTI to which the acknowledgement information is scheduled is the TTI of the CC1 after the length of time equivalent to the integral multiple of the long TTI length of the TTI at which to receive the downlink control information, and is the first TTI as well.

In the example illustrated in FIG. 12, the wireless base station transmits the downlink control information indicating the Cross Carrier Scheduling to the CC1 at the head TTI of the CC4 having the short TTIs. The wireless base station receives the uplink data at a timing after four long TTI lengths. Then, the wireless base station transmits the acknowledgement information at the TTI of the CC4, which corresponds to the long TTI located posterior by 4 to the long TTI of the CC1 at which the uplink data is received. Herein, the TTI position in which to transmit the acknowledgement information corresponds to the head TTI of the CC4.

The operation being thus performed, the user equipment is thereby able to determine the radio resource for receiving the acknowledgement information, based on the TTI position of the downlink control information scheduled to the CC4. The user equipment can therefore reduce the reception load of the acknowledgement information transmitted from the wireless base station. Particularly in the embodiment 2.3, the position of receiving the downlink control information indicating the Cross Carrier Scheduling to the CC1 and the position of receiving the acknowledgement information are fixed to the head TTI, and hence the overhead of the downlink control information can be restrained from rising.

As described above, the embodiment 2.3 enables the user equipment to transmit the uplink data at the CC having the long TTIs, based on the downlink control information received at the CC having the short TTIs.

As discussed above, according to the second embodiment, it is feasible to properly perform the uplink data communication from the user equipment even in the case of the coexistence of the CCs having the shortened TTIs and the CCs having the normal TTIs.

Note that the descriptions of the first and second embodiment discussed above have been made by exemplifying the CCS (Cross Carrier Scheduling) using the CCs having the normal TTI lengths and the CCs having the shortened TTI lengths. The present invention is, however, applicable to any configuration using the plural CCs having the different TTI lengths without being limited to the exemplification given above. For example, the CCs having longer TTI lengths (e.g., super subframes) than normal maybe used in combination with the CCs having the normal TTI lengths, and may also be used in combination with the CCs having the shortened TTI lengths.

The discussions on the first and second embodiments have described the example of combining the CC1 and CC2 together and the example of combining the CC1 and CC4 together. The embodiments are not, however, limited to these examples. The example of setting the "4" as the number of CCs has been given, but the embodiments are not limited to this value. For example, 5 or more CCs are also usable.

Note that wireless communication methods according to the respective embodiments may be solely applied and may also be applied in combination.

(Wire Communication Method)

An architecture of a wireless communication system according to one embodiment of the present invention will hereinafter be described. The wireless communication methods according to the respective embodiments are applied to this wireless communication system.

Figure 13:
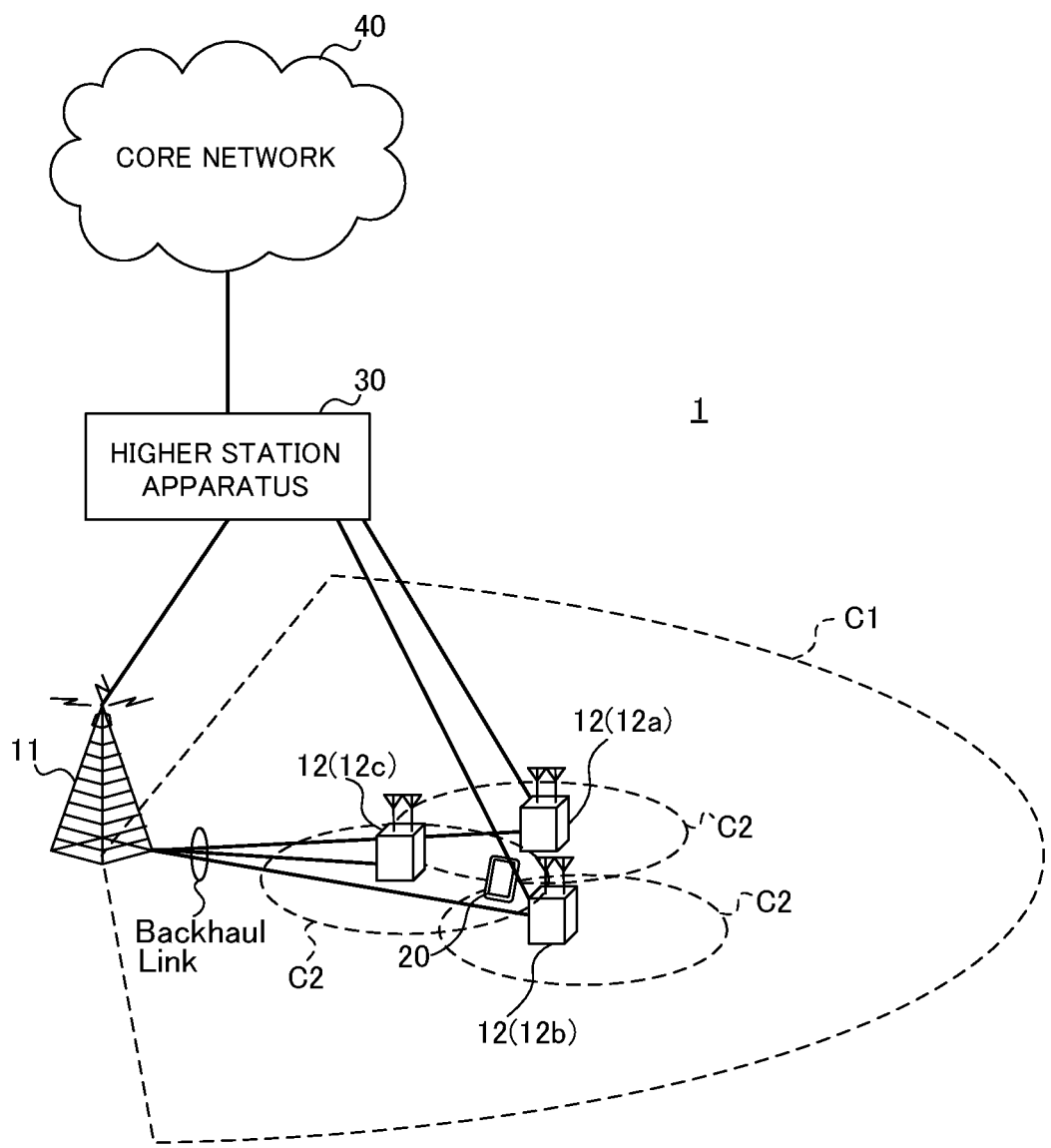
FIG. 13 is a schematic view illustrating an architecture of a wireless communication system according to the present embodiment.

FIG. 13 is a schematic view illustrating the architecture of the wireless communication system according to the embodiment. The carrier aggregation (CA) configured by aggregating a plurality of fundamental frequency blocks (component carriers) with one unitary parameter being a system bandwidth (e.g., 20 MHz) of an LTE system and/or dual connectivity (DC) can be applied to a wireless communication system 1. Note that the wireless communication system 1 may also be referred to as SUPER 3G, LTE-A (LTE-Advanced), IMT-Advanced, 4G (4th generation mobile communication system), 5G (5th generation mobile communication system), and FRA (Future Radio Access).

The wireless communication system 1 illustrated in FIG. 13 includes a wireless base station 11 configuring a macro cell C1, and wireless base stations 12 (12a to 12c) configuring small cells C2, each smaller than the macro cell C1. User equipment 20 is disposed in the macro cell C1 and the respective small cells C2.

The user equipment 20 is connectable to both the wireless base station 11 and the wireless base station 12. It is assumed that the user equipment 20 simultaneously uses the macro cell C1 and the small cell C2, which employ different frequencies, through the CA or the DC. The user equipment 20 can apply the CA or the DC by employing the plural cells (CCs) (e.g., six or more CCs). The shortened TTIs can be applied to the UL (uplink) transmission and/or DL (downlink) transmission between the user equipment 20 and the wireless base station 11/wireless base station 12.

The communications between the user equipment 20 and the wireless base station 11 may be performed by using a carrier (called an existing carrier and a Legacy carrier) having a narrow bandwidth in a relatively low frequency band (e.g., 2 GHz). While on the other hand, the communications between the user equipment 20 and the wireless base station 12 may involve using a carrier having a broad bandwidth in a relatively high frequency band (e.g., 3.5 GHz or 5 GHz), and may further involve using the same carrier as the carrier between the user equipment 20 and the wireless base station 11. Note that a configuration of the frequency band used by each wireless base station is not limited to these examples.

An available configuration is that the wireless base station 11 and the wireless base station 12 (alternatively, the two wireless base stations 12) may be connected wiredly (using, e.g., an optical fiber conforming to a CPRI (Common Public Radio Interface), an X2 interface or other equivalent interfaces) or wirelessly.

The wireless base station 11 and the wireless base stations 12 are connected respectively to a higher station apparatus 30 and further connected to a core network 40 via the higher station apparatus 30. Note that the higher station apparatus 30 includes, e.g., an access gateway apparatus, a radio network controller (RNC) and a mobility management entity (MME), but the embodiment is not limited to these apparatuses. Each wireless base station 12 may be connected to the higher station apparatus 30 via the wireless base station 11.

Note that the wireless base station 11 is a wireless base station having a relatively broad coverage and may be referred to as a macro base station, an aggregation node, an eNB (evolved NodeB) and a transmission/reception point. The wireless base station 12 is a wireless base station having a local coverage and may be referred to as a small base station, a micro base station, a pico base station, a femto base station, an HeNB (Home eNodeB), an RRH (Remote Radio Head), and the transmission/reception point. The wireless base stations 11 and 12 will hereinafter be generically referred to as wireless base stations 10 unless otherwise distinguished.

Each user equipment 20 is a terminal that supports a variety of communication methods instanced by the LTE and the LTE-A, and may encompass not only a mobile communication terminal but also a fixed communication terminal.

In the wireless communication system 1, OFDMA (Orthogonal Frequency Division Multiple Access) is applied as a wireless access method to the downlink, while SC-FDMA (Single Carrier FDMA) is applied as another wireless access method to the uplink. The OFDMA is defined as a multi carrier transmission method of performing the communications by dividing the frequency band into narrow frequency bands (subcarriers) and mapping the data to the subcarriers. The SC-FDMA is defined as a single carrier transmission method conceived such that a system bandwidth is divided into plural bands formed by single or consecutive resource blocks on a per-terminal basis, and the plural terminals use bands different from each other, thereby reducing interference between the terminals. Note that the uplink and downlink wireless access methods are not limited to the combination thereof, and the OFDMA may be employed on the uplink.

The wireless communication system 1 uses downlink channels instanced by a PDSCH (Physical Downlink Shared Channel), a PBCH (Physical Broadcast Channel) and a downlink L1/L2 control channel, which are shared among the user equipment 20. The user data, the higher-layer control information and a SIB (System Information Block) are transmitted via the PDSCH. An MIB (Master Information Block) is transmitted via the PBCH.

The downlink L1/L2 control channel includes downlink control channels instanced by a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel). The Downlink Control Information (DCI) containing the scheduling information of the PDSCH and the PUSCH is transmitted via the PDCCH. An OFDM symbol count used for the PDCCH is transmitted via the PCFICH. HARQ acknowledgement information (ACK/NACK) for the PUSCH is transmitted via the PHICH. The EPDCCH is frequency-division-multiplexed with the PDSCH (Physical Downlink Shared Channel) and is used for transmitting the DCI in the same manner as the PDCCH.

The wireless communication system 1 further uses the uplink channels instanced by a PUSCH (Physical Uplink Shared Channel), a PUCCH (Physical Uplink Control Channel) and a PRACH (Physical Random Access Channel), which are shared among the user equipments 20. The user data and the higher-layer control information are transmitted via the PUSCH. Uplink Control Information (UCI) containing at least one of the acknowledgement information (ACK/NACK, HARQ-ACK) and wireless quality information (CQI (Channel Quality Indicator)) is transmitted via the PUSCH or the PUCCH. A random access preamble for establishing a connection with the cell is transmitted via the PRACH.

<Wireless Base Station>

Figure 14:
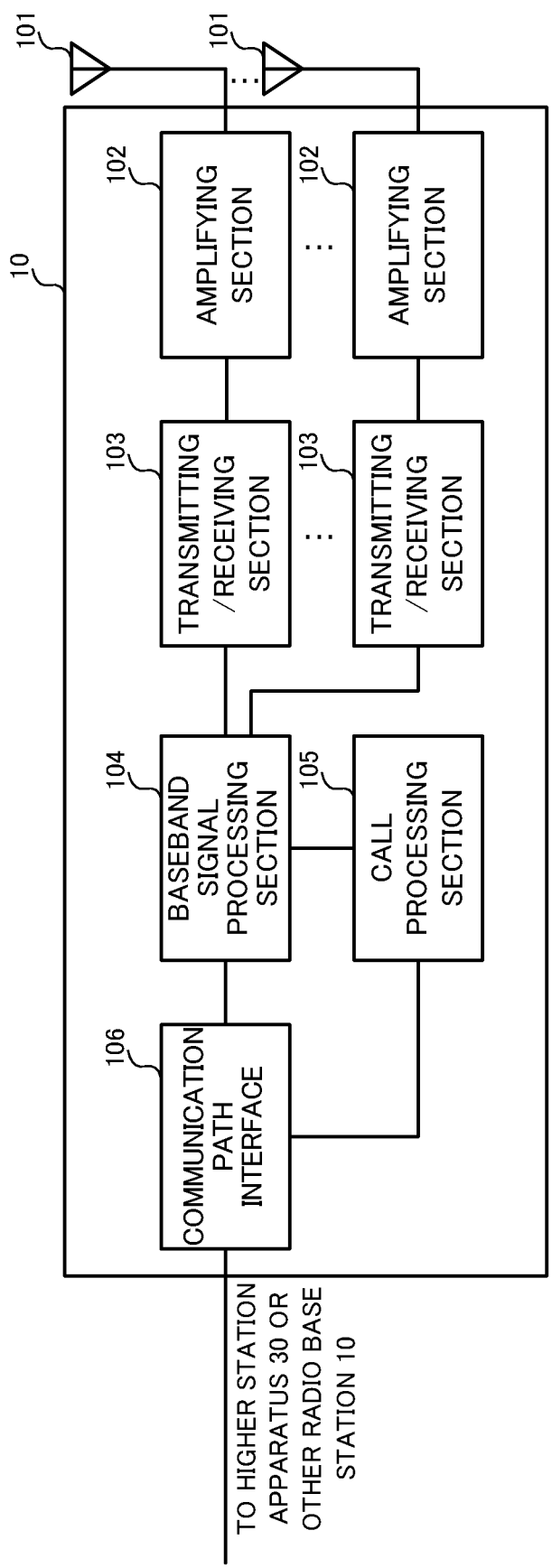
FIG. 14 is a diagram illustrating one example of an overall configuration of a wireless base station according to the present embodiment.

FIG. 14 is a diagram illustrating one example of an overall configuration of a wireless base station according to the embodiment. A wireless base station 10 includes a plurality of transmission/reception antennas 101, an amplifying section 102, a transmitting/receiving section 103, a baseband signal processing section 104, a call processing section 105, and a communication path interface 106. Note that the transmitting/receiving section 103 may also be configured to include a transmitting section and a receiving section.

The user data transmitted to the user equipment 20 from the wireless base station 10 via the downlink is inputted to the baseband signal processing section 104 from the higher station apparatus 30 via the communication path interface 106.

The baseband signal processing section 104 is configured such that the user data is transferred to the transmitting/receiving section 103 after undergoing transmission processes instanced by a PDCP (Packet Data Convergence Protocol) layer process, a user data segmenting/coupling process, an RLC(Radio Link Control) layer transmission process such as RLC retransmission control, MAC (Medium Access Control) retransmission control (e.g., an HARQ (Hybrid Automatic Repeat reQuest) transmission process), scheduling, transmission format selection, channel coding, an IFFT (Inverse Fast Fourier Transform) process, and a pre-coding process. The downlink control signal is also transferred to the transmitting/receiving section 103 after undergoing the transmission process instanced by the channel coding and the IFFT.

The transmitting/receiving section 103 transmits a baseband signal pre-coded and outputted for each antenna from the baseband signal processing section 104 by converting this baseband signal into a radio frequency band. A radio frequency signal, which is frequency-converted by the transmitting/receiving section 103, is amplified by the amplifying section 102 and transmitted from the transmission/reception antenna 101.

The transmitting/receiving section (receiving section) 103 receives the PUCCH (e.g., HARQ-ACK) and the PUSCH transmitted from the user equipment 20. The transmitting/receiving section (receiving section) 103 can determine transmission timings of the HARQ-ACK and the PUSCH transmitted from the user equipment 20 on the basis of the TTI applied to the DL transmission when applying the shortened TTI shorter than the normal TTI to the DL transmission and/or the UL transmission.

The transmitting/receiving section (transmission unit) 103 can transmit the HARQ-ACK via the PHICH to the user equipment.

The transmitting/receiving section 103 may be configured by a transmitter/receiver, a transmission/reception circuit or a transmission/reception device, which are described based on the common recognition in the technical field according to the present invention. Note that the transmitting/receiving section 103 may be configured as the integral transmitting/receiving section, and may also be configured to include the transmission unit and the reception unit.

On the other hand, the radio frequency signal, received by the transmission/reception antenna 101, of the uplink data is amplified by the amplifying section 102. The transmitting/receiving section 103 receives the uplink data amplified by the amplifying section 102. The transmitting/receiving section 103 performs the frequency conversion of the reception signal into the baseband signal, and outputs the baseband signal to the baseband signal processing section 104.

The baseband signal processing section 104 is configured such that the user data contained in the inputted uplink data is transferred to the higher station apparatus 30 via the communication path interface 106 after undergoing an FFT (Fast Fourier Transform) process, an IDFT (Inverse Discrete Fourier Transform) process, error correction decoding, a MAC retransmission control reception process, and an PCL/PDCP layer reception process. The call processing section 105 executes a call process such as setting and releasing the communication channel, and manages a status of the wireless base station 10 and the radio resources.

The communication path interface 106 transmits and receives the signal to and from the higher station apparatus 30 via a certain interface. The communication path interface 106 may also transmit and receive (backhaul signaling) the signal to and from the neighboring wireless base station 10 via an inter base station interface (e.g., the optical fire and the X2 interface conforming to CPRI (Common Public Radio Interface)).

Figure 15:
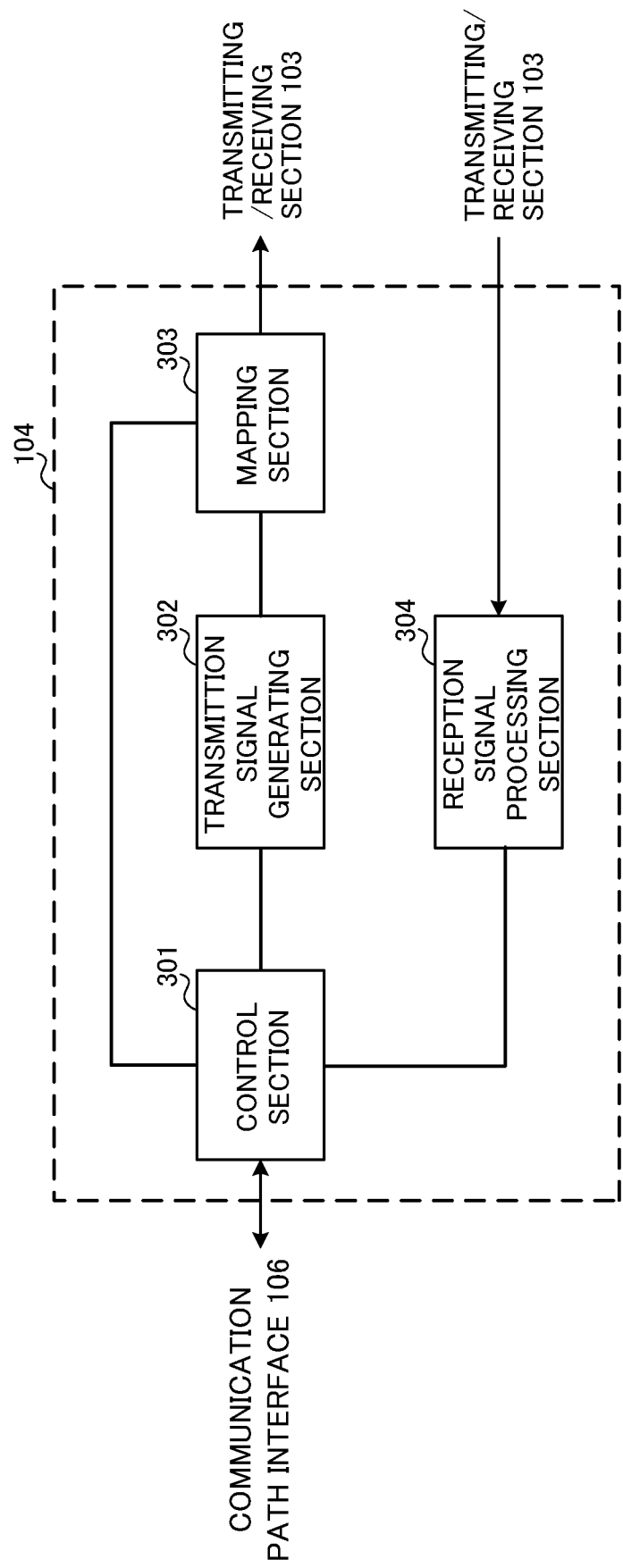
FIG. 15 is a diagram illustrating one example of a configuration of functions of the wireless base station according to the present embodiment.

FIG. 15 is a diagram illustrating one example of a configuration of functions of the wireless base station according to the present embodiment. Note that FIG. 15 mainly illustrates function blocks of characteristic components of the present embodiment and the wireless base station 10 is to include other function blocks suitable for the wireless communications. As depicted in FIG. 15, the baseband signal processing section 104 includes a control section (scheduler) 301, a transmission signal generating section (generating section) 302, a mapping section 303, and a reception signal processing section 304.

The control section (scheduler) 301 controls scheduling (e.g., resource allocation) of the downlink data signal transmitted via the PDSCH and the downlink control signal transmitted via the PDCCH and/or the EPDCCH. The control section (scheduler) 301 also controls the scheduling of system information, a synchronization signal, paging information, a CRS (Cell-specific Reference Signal) and a CSI-RS (Channel State Information Reference Signal). The control section 301 further controls the scheduling of an uplink reference signal, the uplink data signal transmitted via the PUSCH, and the uplink control signal transmitted via the PUCCH and/or the PUSCH.

The control section 301 controls the retransmission of the downlink data and the transmission of new data, based on the acknowledgement information (HARQ-ACK) fed back from the user equipment. The control section 301 controls the transmission time interval (TTI) used for receiving the DL signal of each CC and/or transmitting the UL signal of each CC. Specifically, the control section 301 sets the normal TTI, which is 1 ms, and/or the shortened TTI shorter than the normal TTI.

The control section 301 can group the CCs configured by the same TTI lengths into the same CG (CC Group). The control section 301 also can perform the scheduling (Cross Carrier Scheduling) between the CCs configured by the same TTI lengths, i.e., only within the CG. In this case, the control section 301 can control the scheduling to differentiate the CCs for transmitting the downlink control information from the CCs for transmitting the downlink data within the CG. The control section 301 can further control the scheduling to differentiate the CCs for transmitting the downlink control information from the CCs for receiving the uplink data within the CG (the embodiments 1.1 and 2.1).

The control section 301 can also control the scheduling (Cross Carrier Scheduling) between the CCs configured by the different TTI lengths. In this case, the control section 301 can control so as to schedule the downlink data to the CCs configured by the TTIs having the different TTI lengths from those of the CCs to which the downlink control information is scheduled (the first embodiment).

The control section 301 may control the TTI to which the downlink data is scheduled as below when the TTI length (long TTI) of the CC to which the downlink control information is scheduled is longer than the TTI length (short TTI) of the CC to which the downlink data is scheduled. Performed are the scheduling to any of the short TTIs and the scheduling to the head TTI of the short TTIs. The control section 301, when selecting the short TTI corresponding to the long TTI, may or may not notify the user equipment 20 of a position of the short TTI, and may also control to preset the scheduling to the head TTI (the embodiment 1.2).

The control section 301 may control the TTI to which the downlink control information is scheduled as below when the TTI length (long TTI) of the CC to which the downlink data is scheduled is longer than the TTI length (short TTI) of the CC to which the downlink control information is scheduled. The control section 301 controls to perform scheduling to any of the short TTIs and scheduling to the head TTI of the short TTIs (the embodiment 1.3).

The control section 301 can also control to receive the uplink data from the user equipment 20 on the basis of the downlink control information contained in the downlink control information transmitted to the user equipment 20 (the second embodiment).

The control section 301 may use a variety of DCI formats as the downlink control information. For example, the control section 301 may perform scheduling (control) of the uplink data transmitted by the user equipment 20 by using, e.g., the UL grant (instanced by DCI format 0/4). The control section 301 may further perform scheduling (control) of the downlink data received by the user equipment 20 by using, e.g., a DL assignment (instanced by DCI format 1A).

The control section 301 can also control to perform the communications with the user equipment 20 by employing the plural CCs containing at least two CCs having the different TTI lengths. The control section 301 can further control the communications in the plural CCs. The control section 301 can still further control to transmit the downlink control information, used by the user equipment 20, in order to control the communication in one of the two CCs, in the other CC.

Note that the control section 301 may be configured as a controller, a control circuit or a control device, which are described based on the common recognition in the technical field according to the present invention.

The transmission signal generating section 302 generates the DL signal (instanced by a downlink data signal, a downlink control signal, and a downlink reference signal) based on an instruction given from the control section 301, and outputs the generated DL signal to the mapping section 303. Specifically, the transmission signal generating section 302 generates and outputs the downlink data (PDSCH) containing the user data to the mapping section 303. The transmission signal generating section 302 also generates a downlink control signal (PDCCH/EPDCCH) containing the DCI (the DL assignment/UL grant), and outputs the generated downlink control signal to the mapping section 303.

The reception signal processing section 302 may be configured as a signal generator, a signal generation circuit or a signal generation device, which are described based on the common recognition in the technical field according to the present invention.

The mapping section 303 maps the DL signal generated by the reception signal processing section 302 to a predetermined radio resource, based on the instruction given from the control section 301, and outputs the DL signal to the transmitting/receiving section 103. The mapping section 303 may be configured as a mapper, a mapping circuit or a mapping device, which are described based on the common recognition in the technical field according to the present invention.

The reception signal processing section 304 executes a reception process (such as de-mapping, demodulation and decoding) for the UL signal (HARQ-ACK, PUSCH, PUCCH) transmitted from the user equipment 20. A processing result is outputted to the control section 301. The reception signal processing section 304 may perform channel estimation.

The reception signal processing section 304 may be configured by a signal processor, a signal processor circuit or a signal processor device, and by a measurement instrument, a measurement circuit or a measurement device, which are described based on the common recognition in the technical field according to the present invention.

<User Equipment>

Figure 16:
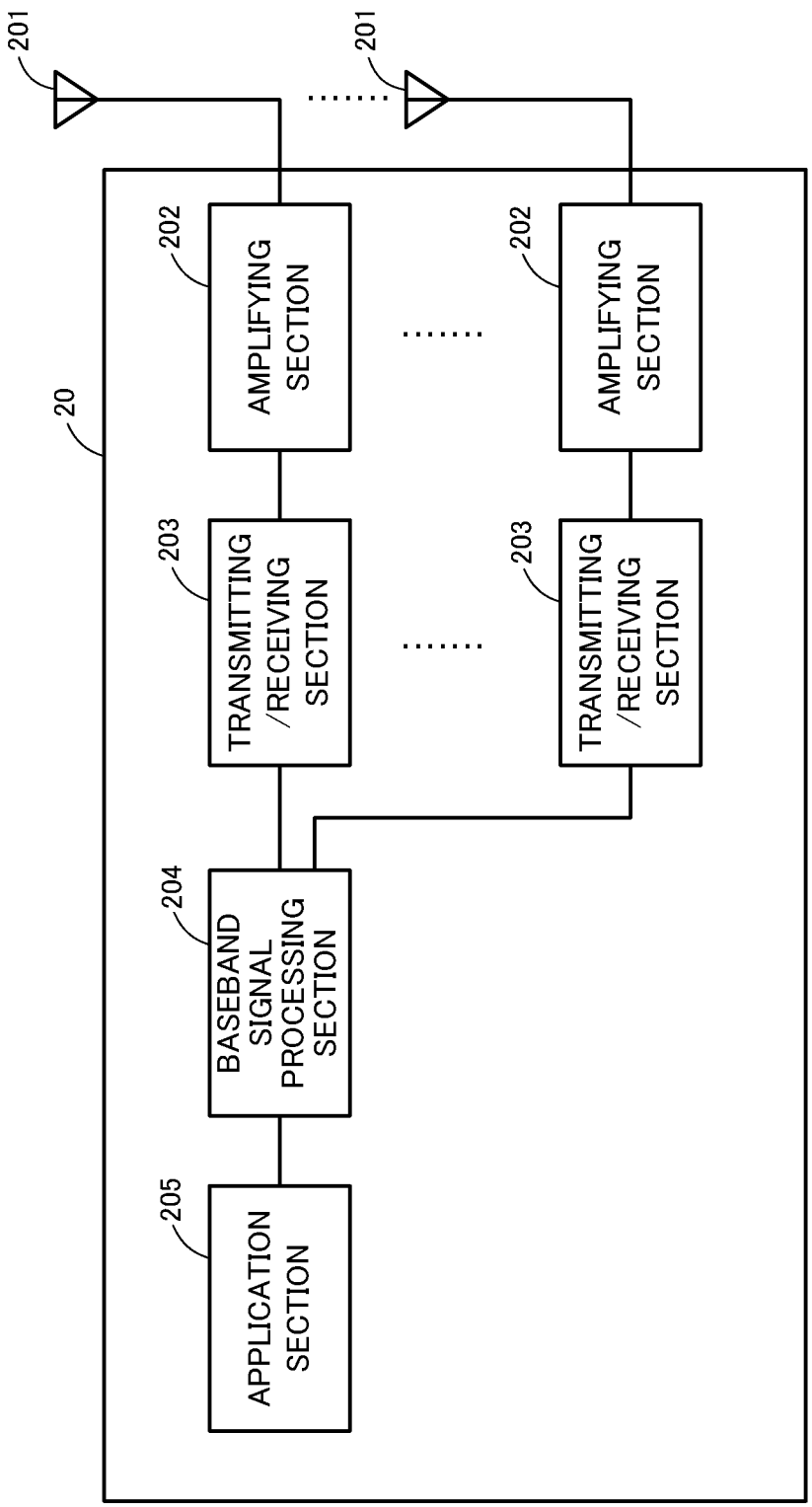
FIG. 16 is a diagram illustrating one example of an overall configuration of the user equipment according to the present embodiment.

FIG. 16 is a diagram illustrating one example of an overall configuration of the user equipment according to the present embodiment. The user equipment 20 includes plural transmission/reception antennas 201 for MIMO (Multiple Input and Multiple Output) transmission, an amplifying section 202, a transmitting/receiving section 203, a baseband signal processing section 204, and an application section 205. Note that the transmitting/receiving section 203 may be configured to include a transmission unit and a reception unit.

The radio frequency signals received by the plural transmission/reception antennas 201 are each amplified by the amplifying section 202. Each transmitting/receiving section 203 receives the downlink data amplified by the amplifying section 202. The transmitting/receiving section 203 performs the frequency conversion of the reception signal into the baseband signal, and outputs the baseband signal to the baseband signal processing section 204.

The transmitting/receiving section (reception unit) 203 receives the DL signal (e.g., the PDSCH) and the DL control signal (e.g., the HARQ-ACK, the DL assignment, the UL grant). The transmitting/receiving section (transmission unit) 203 transmits the HARQ-ACK in response to the DL data signal, and the PUSCH in response to the UL grant/HARQ-ACK.

The transmitting/receiving section (transmission unit) 203 can transmit capability information (UE capability) and other equivalent items of information about a feedback timing of the HARQ-ACK and the PUSCH transmission when the shortened TTI is applied. The transmitting/receiving section 203 is capable of transmitting and receiving the uplink/downlink control signals and the uplink/downlink data at the plural CCs configured by the different TTIs. Note that the transmitting/receiving section 203 may be configured as a transmitter/receiver, a transmission/reception circuit or a transmission/reception device, which are described based on the common recognition in the technical field according to the present invention.

The baseband signal processing section 204 executes the FFT process, the error correction decoding and the retransmission control reception process with respect to the inputted baseband signal. The downlink user data is transferred to the application section 205. The application section 205 executes processes about higher layers than a physical layer and the MAC layer. Of the downlink data, broadcast information is also transferred to the application section 205.

On the other hand, the uplink user data is inputted to the baseband signal processing section 204 from the application section 205. The baseband signal is transferred to each transmitting/receiving section 203 after undergoing a retransmission control transmission process (e.g., an HARQ transmission process), channel coding, pre-coding, a Discrete Fourier Transform (DFT) process and an IFFT process in the baseband signal processing section 204. The transmitting/receiving section 203 converts the baseband signal outputted from the baseband signal processing section 204 into the radio frequency band, and thus transmits the radio frequency signal. The radio frequency signal being frequency-converted by the transmitting/receiving section 203 is amplified by the amplifying section 202 and transmitted from the transmission/reception antenna 201.

Figure 17:
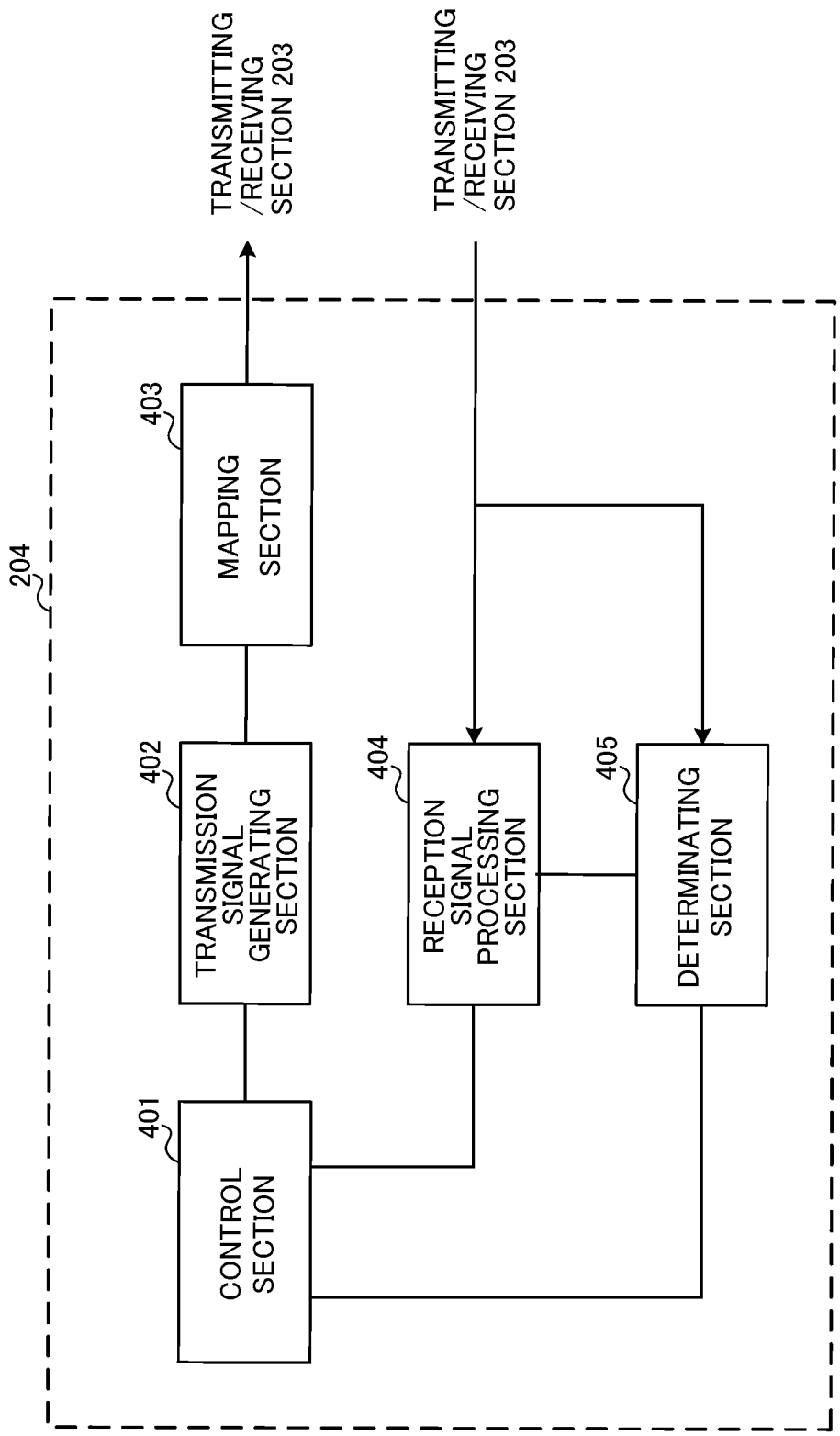
FIG. 17 is a diagram illustrating one example of a configuration of functions of the user equipment according to the present embodiment.

FIG. 17 is a diagram illustrating one example of a configuration of functions of the user equipment according to the present embodiment. Note that FIG. 17 mainly illustrates function blocks of characteristic components of the present embodiment; and, however, the user equipment 20 is to include other function blocks suitable for the wireless communications. As depicted in FIG. 17, the baseband signal processing section 204 of the user equipment 20 includes a control section 401, a transmission signal generating section 402, a mapping section 403, a reception signal processing section 404, and a determination section 405.

The control section 401 acquires, from the reception signal processing section 404, the downlink control signal (the signal transmitted via the PDCCH/EPDCCH) and the downlink data (the signal transmitted via the PDSCH), which are transmitted from the wireless base station 10. The control section 401 controls generation of the uplink control signal (e.g., the acknowledgement information (HARQ-ACK)) and the uplink data, based on a result of determining whether the downlink control signal and the downlink control information entail the retransmission control or not. Specifically, the control section 401 is capable of controlling the transmission signal generating section 402, the mapping section 403 and the reception signal processing section 404.

For example, when the plural CCs having the different TTIs are carrier-aggregated (CA) and when the CCs having the same TTIs are carrier-grouped (CG), the control section 401 can perform the control on the assumption that the Cross Carrier Scheduling (CSS) is conducted between the CCs having the same TTI lengths. The control section 401, when receiving the downlink control information, can control to receive the downlink data on the basis of the downlink control information and to transmit a result of receiving the downlink data as the HARQ-ACK.

The control section 401, when receiving the downlink control information, can control to transmit the uplink data after the predetermined subframes and to receive the HARQ-ACK with respect to a result of receiving the downlink data from the wireless base station 10. When the shortened TTI shorter than the normal TTI is applied to the DL transmission and/or the UL transmission, the control section 401 can control a feedback timing of the acknowledgement information, based on the TTI applied to the received DL signal (the embodiments 1.1 and 2.1).

The control section 401 can control to receive the downlink data that is cross-carrier-scheduled (CCS) on the basis of the received downlink control information. Upon receiving the downlink control information at the long TTI and receiving the downlink data at the short TTI, the control section 401, when the downlink data does not contain any information specifying the scheduled TTI, may control to decode blind the whole short TTIs corresponding to the long TTIs and may also control to decode blind the head TTI of the short TTIs. When the downlink control information contains the information specifying the short TTI to which the downlink data is scheduled, the control section 401 can control to decode blind this short TTI (the embodiment 1.2).

When receiving the downlink control information at the short TTI and receiving the downlink data at the long TTI on the basis of the downlink control information, the control section 401 can control to detect the whole of the short TTIs configuring the short TTIs corresponding to a time interval of the long TTI with respect to the short TTI at which to receive the downlink control information, and can also control to detect only the head TTI of the short TTIs corresponding to the time interval of the long TTI (the embodiment 1.3).

When receiving the downlink control information at the long TTI and transmitting the uplink data at the short TTI on the basis of the downlink control information, the control section 401 may control to transmit the uplink data also in a head position (coincident with the head position of the corresponding long TTI) of the short TTIs, and may also control to transmit the uplink data in a position of the short TTI that is notified from the wireless base station (the embodiment 2.2).

When receiving the downlink control information at the short TTI and transmitting the uplink data at the long TTI on the basis of the downlink control information, the control section 401 may control to transmit the uplink data at any of the whole of the short TTIs configuring the short TTIs corresponding to the time interval of the long TTI with respect to the short TTI at which to receive the downlink control information, and may also control to transmit the uplink data at the head TTI of the short TTIs corresponding to the time interval of the long TTI (the embodiment 2.3).

When transmitting the uplink data on the basis of the received downlink control information, the control section 401 controls to receive the acknowledgement information in response to the uplink data at the CC in which to receive the downlink control information after a length of time equivalent to an integral multiple of the long TTI length (which is the TTI length of the CC in which to receive the downlink control information, or the long TTI length of the TTI lengths of the CC in which to transmit the uplink data) from the TTI at which to receive the downlink control information.

The control section 401 can further control to perform the communications by using the plural CCs containing at least two CCs having the different TTI lengths. The control section 401 can control to receive the downlink control information by using one of the two CCs. The control section 401 can further control the communications in the other CC, based on the downlink control information.

When the TTI length of the CC in which to receive the downlink control information is different from the TTI length of the CC in which to receive the downlink data signal, the control section 401 can control to receive the downlink data on the basis of the downlink control information at, at least, one of the TTIs of the CC in which to receive the data signal, which is overlapped with the TTI at which to receive the downlink control information in the CC for receiving the downlink control information. The TTI at which to receive the downlink control information in the CC for receiving the downlink control information may also be the first TTI overlapped with the TTI at which to receive the downlink data signal.

The control section 401 can control to receive the downlink data at the first TTI of the CC in which to receive the downlink data signal, which is overlapped with the TTI at which to receive the downlink control information in the CC for receiving the downlink control information.

When the TTI length of the CC in which to receive the downlink control information is different from the TTI length of the CC in which to receive the downlink data signal, the control section 401 can control to transmit the uplink data on the basis of the downlink control information at, at least, one of the TTIs of the CC in which to transmit the uplink data signal, which is overlapped with the TTI of the CC in which to receive the downlink control information after the predetermined length of time elapsing from the TTI at which to receive the downlink control information in the CC for receiving the downlink control information. The predetermined length of time may be equivalent to an integral multiple of the longer of the TTI length of the CC for receiving the downlink control information and the TTI length of the CC for transmitting the uplink data signal.

The control section 401 can further control to receive the acknowledgement information in response to the uplink data at the TTI of the CC in which to receive the downlink control signal after the length of time equivalent to the integral multiple of the longer TTI length (i.e., the integral multiple of the longer of the TTI length of the CC for receiving the downlink control information and the TTI length of the CC for transmitting the uplink data) from the TTI at which to receive the downlink control information in the CC for receiving the downlink control information.

The control section 401 may be configured as a controller, a control circuit or a control device, which are described based on the common recognition in the technical field according to the present invention.

Based on an instruction given from the control section 401, the transmission signal generating section 402 generates and outputs the UL signal to the mapping section 403. For example, the transmission signal generating section 402 generates, based on the instruction given from the control section 401, the uplink control signals of the acknowledgement information (HARQ-ACK), channel state information (CSI) and other equivalent items of information.

The transmission signal generating section 402 generates the uplink data, based on the instruction given from the control section 401. For instance, the control section 401 instructs the transmission signal generating section 402 to generate the uplink data when the UL grant is contained in the downlink control signal notified (transmitted) from the wireless base station 10. The transmission signal generating section 402 may be configured as a signal generator, a signal generation circuit or a signal generation device, which are described based on the common recognition in the technical field according to the present invention.

The mapping section 403 maps, to the radio resource, the uplink data (the uplink control signal and/or the uplink data) generated by the transmission signal generating section 402 on the basis of the instruction given from the control section 401, and outputs the mapped uplink data to the transmitting/receiving section 203. The mapping section 403 may be configured as a mapper, a mapping circuit or a mapping device, which are described based on the common recognition in the technical field according to the present invention.

The reception signal processing section 404 executes the reception process (such as de-mapping, demodulation and decoding) for the DL signal (e.g., the downlink control signal transmitted from the wireless base station, the downlink data transmitted via the PDSCH). The reception signal processing section 404 outputs the information received from the wireless base station 10 to the control section 401 and the determination section 405. The reception signal processing section 404 outputs, e.g., the broadcast information, the system information, RRC signaling and the DCI, to the control section 401.

The reception signal processing section 404 may be configured by a signal processor, a signal processor circuit or a signal processor device, and by a measurement instrument, a measurement circuit or a measurement device, which are described based on the common recognition in the technical field according to the present invention. The reception signal processing section 404 may configure a reception unit according to the present invention.

Based on a result of decoding by the reception signal processing section 404, the determination section 405 makes a retransmission control determination (ACK/NACK) and outputs a determination result to the control section 401. When the downlink data (PDSCH) are transmitted from the plurality of CCs (e.g., six or more CCs), the determination section 405 executes the retransmission control determination (ACK/NACK) with respect to each CC, and outputs the determination result to the control section 401. The determination section 405 may be configured by a determination circuit or a determination device, which are described based on the common recognition in the technical field according to the present invention.

Note that the referred block diagrams describing the embodiments illustrate the blocks on a function basis. Such function blocks (function units) are attained by arbitrarily combining hardware components and software modules. Means configured to attain the respective function blocks are not particularly limited. To be specific, each function block may be attained by one physically integrated apparatus, and may also be attained by plural, i.e., two or more, physically separated apparatuses that are interconnected wiredly or wirelessly.

For example, part or the whole of the functions of the wireless base station 10 and the user equipment 20 may be attained by using the hardware instanced by an ASIC (Application Specific Integrated Circuit), a PLD (Programmable Logic Device) or an FPGA (Field Programmable Gate Array). Each of the wireless base station 10 and the user equipment 20 may be attained by a computer apparatus including a processor (CPU (Central Processing Unit)), a communication interface for establishing the connection to the network, a memory, and a non-transitory computer readable storage medium retaining programs. In other words, each of the wireless base station, the user equipment and other equivalent apparatuses according to one embodiment, may function as a computer that executes the processes of the wireless communication method according to the present invention.

The processor, the memory and other equivalent components are interconnected via a bus for communicating the information. The non-transitory computer readable recording medium is a storage medium instanced by a flexible disk, a magneto-optical disk, a ROM (Read Only Memory), an EPROM (Erasable Programmable ROM), a CD-ROM (Compact Disc-ROM), a RAM (Random Access Memory) and a hard disk. The programs may be transmitted from the network via a telecommunication line. Each of the wireless base station 10 and the user equipment 20 may include an input device instanced by input keys, and an output device instanced by a display.

The configurations of the functions of the wireless base station 10 and the user equipment 20 may be attained hardwarewise, may also be attained by software modules implemented by the processor, and may further be attained by a combination of both of the software modules and the hardware components. The processor controls the whole of the user equipment by operating an Operating System (OS). The processor reads the programs, the software modules and the data from the storage medium into the memory, and executes the variety of processes in accordance with these categories of software.

It may be sufficient that the program is compiled to cause the computer to perform the respective operations described in the embodiments discussed above. For example, the control section 401 of the user equipment 20 may be attained by a control program stored in the memory and running on the processor, and other function blocks may be attained in the same way.

The software, the instructions and other equivalents may be transmitted and received via a transmission medium. For instance, when the software is transmitted from a website, a server or other remote sources by employing wired (cable) technologies exemplified by a coaxial cable, an optical fiber cable, a twist pair or a digital subscriber line (DSL), and/or wireless (radio) technologies exemplified by infrared-rays, radio transmission or microwaves, the wired technologies and/or the wireless technologies are encompassed within definitions of the transmission mediums.

Note that the terminology explained in the present specification and/or the terminology available for comprehending the present specification may be replaced with terminology having the same or similar meanings. For example, the channel and/or the symbol may be defined as the signal (signaling). The signal may be defined as a message. The component carrier (CC) may be called a carrier frequency, a cell or other equivalent technical terms.

The information, the parameters and other equivalents explained in the present specification may be expressed by absolute values, may also be expressed by relative values from a certain reference value, and may further be expressed by different types of information corresponding to thereto. For instance, the radio resource may be what is indicated by an index.

The information, the signal and other equivalents explained in the present specification may also be expressed by making use of any of multiple different technologies. For example, the data, the instruction, the command, the information, the signal, the bit, the symbol, the chip and other equivalents, which are stated in the foregoing descriptions throughout, may be expressed by a voltage, an electric current, an electromagnetic wave, a magnetic field or a magnetic particle, a photo field or a photon, or by combinations thereof.

The respective modes/embodiments discussed in the present specification may be solely used, may also be used in combination, and may further be used by being switched over along with the execution thereof. The notification of a certain item of information (e.g., the notification of "being X") may be made not only explicitly but also implicitly (e.g., this may be fulfilled by not making the notification of a certain item of information).

The notification of the information may be made by other methods without being limited to the modes/embodiments discussed in the present specification. For example, the notification of the information may be carried out by the physical layer signaling (e.g., the DCI (Downlink Control Information), the UCI (Uplink Control Information)), the higher layer signaling (e.g., RRC (Radio Resource Control) signaling, MAC (Medium Access Control) signaling, the broadcast information (MIB (Master Information Block), SIB (System Information Block))), other signals or combinations thereof. The RRC signaling may be called an RRC message and may also be, e.g., an RRC connection setup (RRCConnectionSetup) message and an RRC connection reconfiguration (RRCConnectionReconfiguration) message.

The modes/embodiments discussed in the present specification may be applied to systems utilizing the existing systems, and/or next generation systems being scalable based on these existing systems instanced by LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other proper systems.

The processing procedures, the sequences and the flowcharts in the modes/embodiments discussed in the present specification may be replaced in order unless contradictory. For instance, the method described in the present specification exhibits elements of a variety of steps in an exemplary order, but the embodiment is not limited to the exhibited specific order.

The in-depth description of the present invention has been described so far, but it is, however, apparent to persons skilled in the art that the present invention is not limited to the embodiments discussed in the present specification. The present invention can be carried out by way of amended and modified embodiments without departing from the spirit and scope of the present invention, which are defined by the description of the scope of claims. The description of the present specification is therefore intended for illustrative explanation only and does not impose any limited interpretation on the present invention.

The invention claimed is:

1. A terminal comprising:
   a receiving section that receives downlink control information (DCI); and
   a control section that assumes that scheduling of 1 ms Transmission Time Interval (TTI) length in a first CC is performed based on DCI that is received in 1 ms TTI length of a second CC that is different from the first CC and is not performed based on DCI that is received in TTI length shorter than 1 ms of a third CC that is different from the first CC.

2. The terminal according to claim 1, wherein the terminal is configured with a first cell group (CG) including the first CC and the second CC, the terminal is configured with a second CG including the third CC, and a TTI length used in the second CG is configured to be different from a TTI length used in the first CG.

3. A radio communication method for a terminal, comprising:
   receiving downlink control information (DCI); and
   assuming that scheduling of 1 ms Transmission Time Interval (TTI) length in a first CC is performed based on DCI that is received in 1 ms TTI length of a second CC that is different from the first CC and is not performed based on DCI that is received in TTI length shorter than 1 ms of a third CC that is different from the first CC.

4. A radio base station comprising:
   a transmission section that transmits downlink control information (DCI) to a terminal; and
   a control section that assumes that scheduling of 1 ms Transmission Time Interval (TTI) length in a first CC is performed based on DCI that is received by the terminal in 1 ms TTI length of a second CC that is different from the first CC and is not performed based on DCI that is received by the terminal in TTI length shorter than 1 ms of a third CC that is different from the first CC.

* * * * *